(12) United States Patent
Liu et al.

(10) Patent No.: US 12,190,037 B2
(45) Date of Patent: Jan. 7, 2025

(54) MULTIPLE POWER DOMAINS USING NANO-SHEET STRUCTURES

(71) Applicant: Taiwan Semiconductor Manufacturing Company Limited, Hsinchu (TW)

(72) Inventors: Jack Liu, Taipei (TW); Kuo-Nan Yang, Hsinchu (TW)

(73) Assignee: TAIWAN SEMICONDUCTOR MANUFACTURING COMPANY LIMITED, Hsinchu (TW)

( * ) Notice: Subject to any disclaimer, the term of this patent is extended or adjusted under 35 U.S.C. 154(b) by 0 days.

(21) Appl. No.: 18/361,519

(22) Filed: Jul. 28, 2023

(65) Prior Publication Data
US 2024/0020452 A1    Jan. 18, 2024

Related U.S. Application Data

(63) Continuation of application No. 16/859,459, filed on Apr. 27, 2020, now Pat. No. 11,748,543.

(51) Int. Cl.
G06F 30/392    (2020.01)
G06F 30/3953   (2020.01)
H01L 23/522    (2006.01)
H01L 29/06     (2006.01)
G06F 119/06    (2020.01)

(52) U.S. Cl.
CPC ........ G06F 30/392 (2020.01); G06F 30/3953 (2020.01); H01L 23/5226 (2013.01); H01L 29/0665 (2013.01); G06F 2119/06 (2020.01)

(58) Field of Classification Search
CPC .................................................. G06F 30/392

USPC ........................................................ 716/120
See application file for complete search history.

(56) References Cited

U.S. PATENT DOCUMENTS 7,948,292 B1 *   5/2011   Chiu .............. H01L 27/11898
                                                326/62
2020/0117226 A1   4/2020   Siddiqi et al.
2020/0135735 A1 * 4/2020   Sengupta ........... H01L 29/785

FOREIGN PATENT DOCUMENTS

TW    201441144 A    11/2014
TW    201447720 A    12/2014
TW    201631506 A     9/2016

OTHER PUBLICATIONS

Office Action issued in connection with Taiwan Appl. No. 109130500 dated Dec. 21, 2023.

(Continued)

Primary Examiner — Eric D Lee
(74) Attorney, Agent, or Firm — FOLEY & LARDNER LLP

(57) ABSTRACT

One aspect of this description relates to an integrated circuit (IC) structure including a first layer and a second layer. The first layer includes a first metal structure coupled to a first power supply having a first voltage level and a second metal structure coupled to a second power supply having a second voltage level different from the first voltage level. The second layer is formed over the first layer. The second layer includes a first nano-sheet device coupled to the first metal structure and a second nano-sheet device adjacent to the first nano-sheet device. The second nano-sheet device is coupled to the second metal structure. A distance between the first nano-sheet device and the second nano-sheet device is less than a minimum n-well to n-well spacing.

20 Claims, 14 Drawing Sheets

(56) References Cited

OTHER PUBLICATIONS

Non-Final Office Action on U.S. Appl. No. 16/859,459 DTD Jan. 5, 2023.
Notice of Allowance on U.S. Appl. No. 16/859,459 DTD Apr. 26, 2023.

* cited by examiner

MULTIPLE POWER DOMAINS USING NANO-SHEET STRUCTURES

CROSS-REFERENCE TO RELATED APPLICATION

This application is a continuation application of U.S. patent application Ser. No. 16/859,459, filed on Apr. 27, 2020, which is incorporated herein by reference in its entirety for all purposes.

BACKGROUND

The present application relates to IC circuit schematic diagrams, IC layout diagrams, and IC structures, and more specifically, to multiple power domains using nano-sheet structures.

An integrated circuit (IC) typically includes a number of semiconductor devices otherwise known as IC devices. One way to represent an IC device is with a plan view diagram referred to as a layout diagram, or IC layout diagram. An IC layout diagram is hierarchical and includes modules which carry out high-level functions in accordance with the IC device's design specifications. The modules are often built from a combination of cells that can include both standard and custom cells, each of which represents one or more semiconductor structures.

Cells are configured to provide common, low-level functions, often performed by transistors based on gate regions that intersect active regions. The elements of a cell are arranged within a cell boundary and electrically connected to other cells through interconnect structures.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figures 1A, 1B:
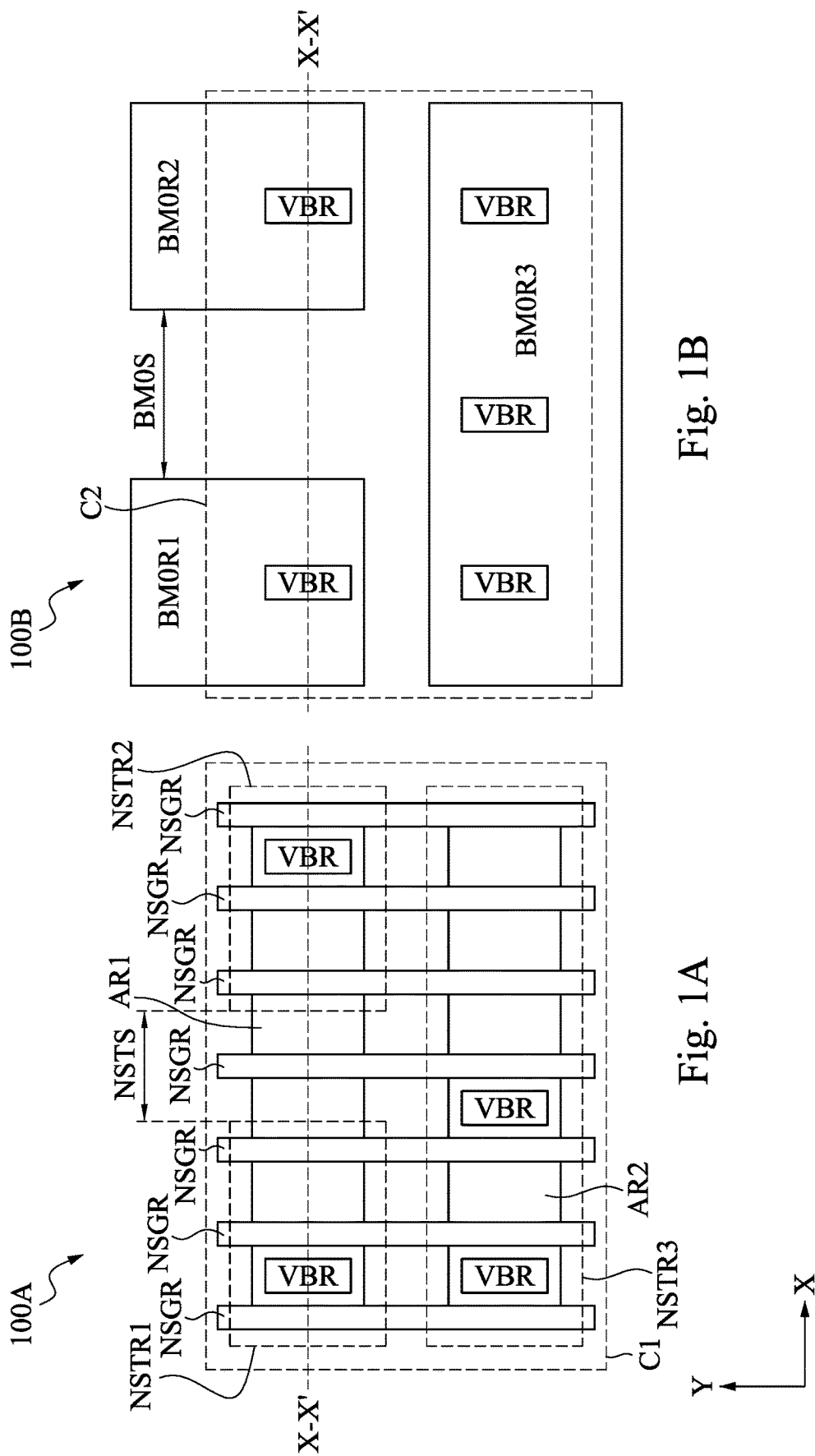
FIG. 1A depicts an integrated circuit (IC) layout diagram of a cell, in accordance with some embodiments.
FIG. 1B depicts an IC layout diagram of a cell, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Bulk semiconductor technologies, such as bulk complementary metal-oxide semiconductor (CMOS), require separate n-wells for separate power domains. Each n-well has a minimum spacing requirement. Thus, spacing penalties are incurred in fabricating IC structures having multiple power domains, such as level shifters. Further, the minimum n-well spacing does not scale proportionally with lower gate lengths.

In various embodiments, a method, system, and structure correspond to an IC layout diagram of a cell defining nano-sheet structures coupled to separate, different power domains, wherein the nano-sheet structures either are not intersecting with an n-well region or are sharing a same n-well region. In some embodiments, a first nano-sheet structure corresponds to a first power domain and a second nano-sheet structure corresponds to a second power domain. In some embodiments, a distance between the first and second nano-sheet structure is less than a minimum n-well to n-well spacing. In some embodiments, the nano-sheet structures are coupled to backend metals and backside vias.

In some embodiments, the first nano-sheet structure is coupled to a backend metal and the second nano-sheet structure is coupled to a backend metal. In some embodiments, backside power is transferred to front side using pickup cells. In some embodiments, the first nano-sheet structure is on a first die using the first power domain, the second nano-sheet structure is on a second die using the second power domain, and complimentary signals are generated on the first die and transferred to the second die. Some embodiments of the present disclosure reduce die area by eliminating the n-well spacing overhead, more efficiently deliver power through back-side rails, reduce leakage between two power supply domains, and reduce the effort for power distribution.

FIG. 1A depicts an IC layout diagram 100A of a cell C1, in accordance with some embodiments. FIG. 1A is a depiction of non-limiting example of an IC layout diagram 100A generated by executing one or more operations of method 200 as discussed below, in some embodiments. IC layout diagram 100A is simplified for the purpose of illustration. In various embodiments, one or more of IC layout diagram 100A includes features in addition to those depicted in FIG. 1A, e.g., one or more transistor elements, power rails, isolation structures, wells, conductive elements, or the like.

FIG. 1A further depicts an X direction and a Y direction perpendicular to the X direction. The X direction being depicted as horizontal with respect to the page and the Y direction being depicted as vertical are a non-limiting example for the purpose of illustration. In various embodiments, the X and Y directions are perpendicular to each other and have orientations other than those depicted in FIG. 1A. In some embodiments the X direction is a "first direction" and the Y direction is a "second direction." In other embodiments, the Y direction is the "first direction" and the X direction is the "second direction."

The cell C1 corresponds to one or more nano-sheet structures (e.g., devices). The cell C1 includes one or more active regions ARs in a first layer of the cell C1 extending in a first direction (e.g., the X direction). For example, the cell C1 includes an AR1 extending in the first direction and an AR2 separated from AR1 in the second direction and extending in the first direction (collectively, "AR"). The active region AR is a region in an IC layout diagram included in a manufacturing process as part of defining an active area OD, in some embodiments, in a semiconductor substrate. An active area is a continuous section of the semiconductor substrate having either n-type or p-type doping. In some embodiments, AR1 corresponds to a p-type device having p-type doing and AR2 corresponds to an n-type device having n-type-doping.

The cell C1 includes one or more nano-sheet gate regions NSGRs in a second layer of C1 over the first layer. The NSGRs extend in a second direction (e.g., the Y direction) perpendicular to the first direction and overlap the one or more ARs. In some embodiments, the AR is on a first layer of C1 and the NSGR is on a second layer of C1 over the first layer. NSGRs are regions in an IC layout diagram included in a manufacturing process as part of defining a nano-sheet gate NSG, which are detailed with respect to FIG. 1E.

The NSGRs intersect (e.g., overlap) the ARs, thereby defining, at least in part, one or more nano-sheet transistors. The cell C1 includes nano-sheet transistor regions NSTR1, NSTR2, and NSTR3 (collectively, "NSTR"). NSTRs are regions in an IC layout diagram included in a manufacturing process as part of defining a nano-sheet transistor. NSTR1 and NSTR2 includes NSGRs intersecting portions of AR1. NSTR3 includes NSGRs intersecting AR2. In some embodiments, a dielectric region DR (e.g., the DR with respect to FIG. 5A) is disposed (e.g., located placed) in between NSTR1 and NSTR2. In some embodiments, DR extends in the X direction. In some embodiments, DR abuts with NSTR1 in the Y direction, and DR abuts with NSTR2 in the Y direction. In some embodiments, a gate region GR is disposed in between NSTR1 and NSTR2. In some embodiments, GR extends in the X direction. In some embodiments, GR abuts with NSTR1 in the Y direction, and GR abuts with NSTR2 in the Y direction. In some embodiments, gate region GR is surrounded or substantially surrounded by dielectric region DR, such that DR is in between NSTR1 and NSTR2. NSTR1 and NSTR2 are separated by a distance in the first direction (e.g., separation, spacing) NSTS. In some embodiments, NSTS is less than the minimum n-well to n-well spacing (e.g., based on manufacturing design rules). In some embodiments, BMOS is less than 5 times at least one of a contacted poly pitch (CPP) and a NSGR pitch. In some embodiments, the NSTRs share a same n-well region. The n-well region is a region in an IC layout diagram included in a manufacturing process as part of defining an n-well.

FIG. 1B depicts an IC layout diagram 100B of a cell C2, in accordance with some embodiments. The cell C2 corresponds to one or more backend metals that are coupled to the nano-sheet structures. The cell C2 includes a first layer under the first layer of the cell C1. The first layer of C2 includes backend metal regions BMOR1, BMOR2, and BMOR3 (collectively, "BMOR"). BMORs are metal regions in an IC layout diagram included in a manufacturing process as part of defining a metal structure (e.g., metal pattern, metal track, metal rail, etc.). BMOR1 corresponds to a metal structure that is coupled to (e.g., connected to, carrying, etc.) a first supply (e.g., power supply, power rail, power supply signal, etc.) having a first voltage level (e.g., VDD1). BMOR2 corresponds to a metal structure that is coupled to a second supply having a second voltage level (e.g., VDD2) different from the first voltage level. Thus, the first supply and the second supply are associated with different power domains. BMOR3 corresponds to a metal structure that is coupled to a ground (e.g., ground rail, ground signal, etc.). BMOR1 and BMOR2 are separated by a distance (e.g., separation, spacing) BMOS in the first direction. In some embodiments, BMOSR is less than the minimum n-well to n-well spacing (e.g., based on manufacturing design rules). In some embodiments, BMOS is less than 5 times at least one of a contacted poly pitch (CPP) and a NSGR pitch. In some embodiments, BMOS is less than, equal to, or greater than NSTS. BMOR3 is separated from (e.g., offset from each other, adjacent to, etc.) BMOR1 and BMOR2 in the second direction.

In some embodiments, at least one of the cells C1 and C2 includes one or more backside via regions VBRs. In some embodiments, the VBRs are in a first layer (e.g., VBR layer) in between the first layer of C1 and the first layer of C2 (e.g., VBR is not part of the cell C1 or C2). The VBRs are placed (e.g., disposed) in between NSGRs in the first direction, extend in the second direction, and overlap (e.g., intersect) the AR. A via region, e.g., one of the VBRs depicted in FIG. 1A, is a region in an IC layout diagram included in a manufacturing process as part of defining a via structure configured to provide a low resistance electrical connection between conductive segments in two or more levels and/or layers of the manufacturing process.

The cell C1 is placed (e.g., formed) over C2 (e.g., the cell C1 is a first cell layer over C2, which is the second cell layer). The VBRs correspond to vias coupling active area AA to backend metals BM0. For example, a first VBR corresponds to a first via coupling NSTR1 (e.g., a first portion of AA) to a first backend metal BM01 corresponding to BMOR1, and a second VBR corresponds to a second via coupling NSTR2 (e.g., a second portion of AA) to a second backend metal BM02 corresponding to BMOR2.

Figure 1D:
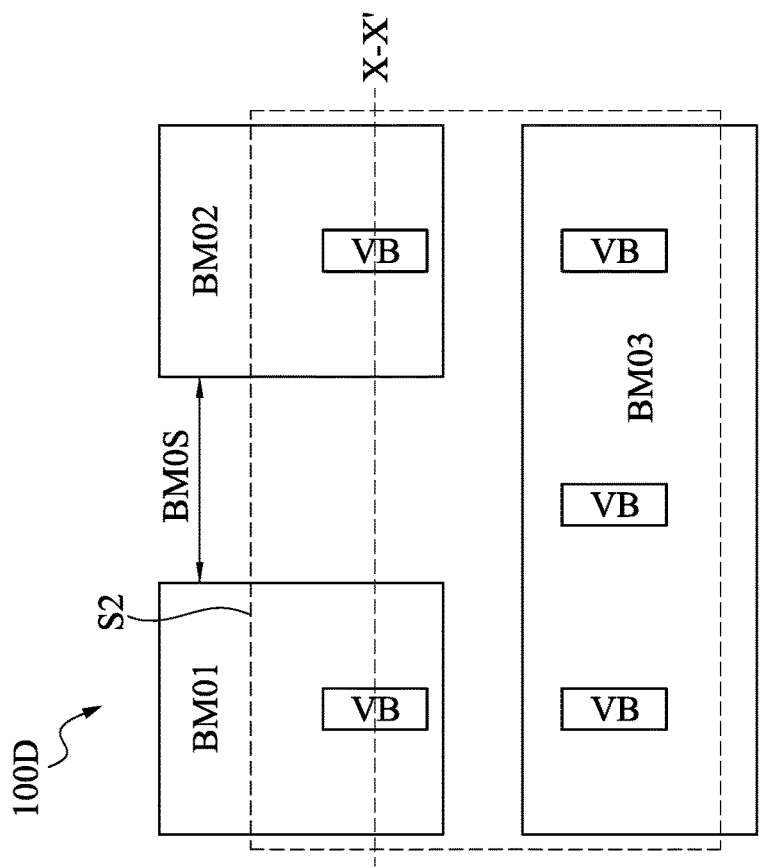
FIG. 1D depicts an IC structure, in accordance with some embodiments.
Figure 1C:
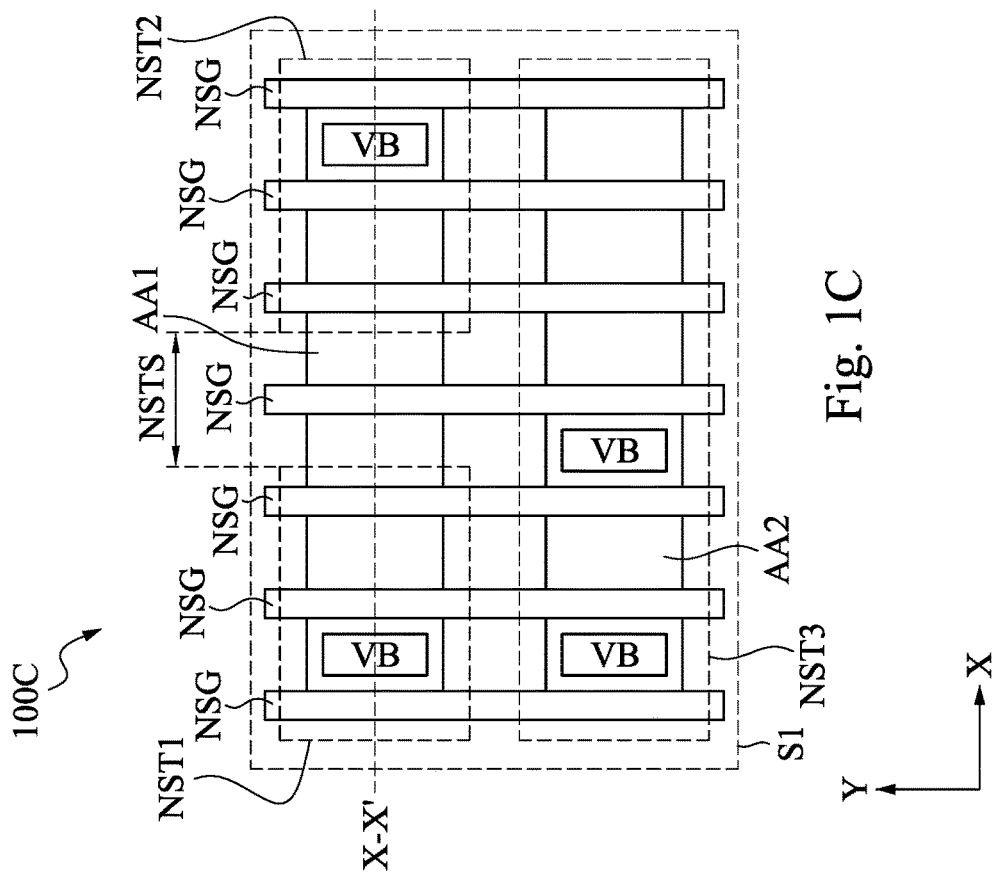
FIG. 1C depicts an IC structure, in accordance with some embodiments.

FIG. 1C depicts an IC structure 100C, in accordance with some embodiments. The IC structure 100C is formed (e.g., defined, generated) based on the IC layout diagram 100A. Thus, AA, NSG, NST1, NST2 are formed based on AR, NSGR, NSTR1, NSTR2, respectively.

FIG. 1D depicts an IC structure 100D, in accordance with some embodiments. The IC structure 100D is formed (e.g., defined, generated) based on the IC layout diagram 100B. Thus, BM01, BM02, and BM03 are formed based on BMOR1, BMOR2, and BMOR3, respectively. In at least one of the IC structures 100C and 100D, VB is formed based on VBR.

The IC structure 100C is a first layer and the IC structure 100D is a second layer under the first layer. The terms "first layer" and "second layer" (e.g., and "third layer," "fourth layer," etc.) are interchangeable (e.g., the IC structure 100D is a first layer and the IC structure 100C is a second layer over the first layer.

Figure 1E:
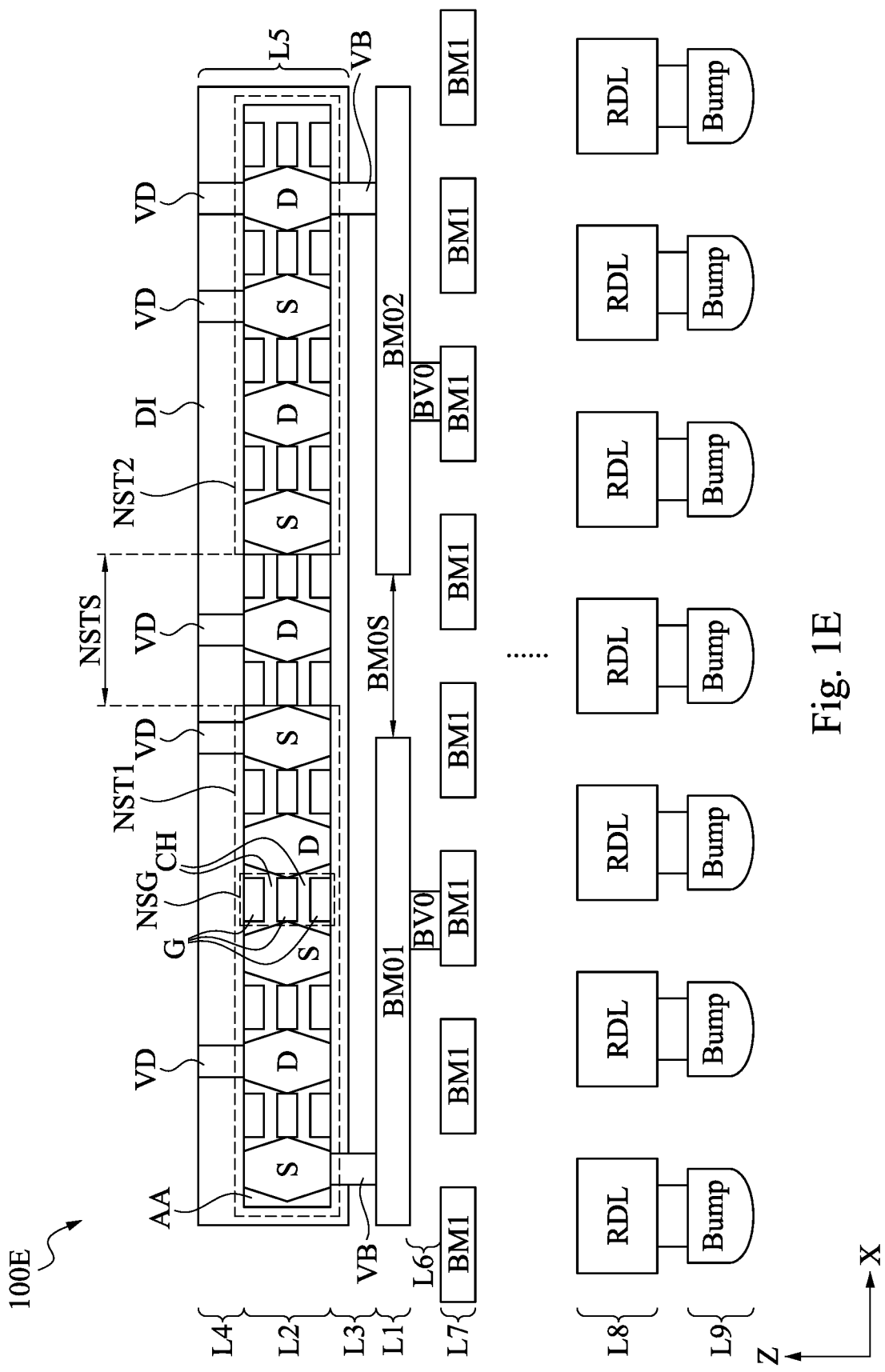
FIG. 1E depicts an IC structure, in accordance with some embodiments.

FIG. 1E depicts an IC structure 100E, in accordance with some embodiments. The IC structure 100E is an x-x' cross sectional view of the IC structures 100C and 100D, with additional details, in accordance with some embodiments. The structure 100E includes a first layer L1 including backend metals BM01 and BM02. BM01 is a metal structure that is coupled to a first supply having a first voltage level (e.g., VDD1). BM02 is a metal structure that is coupled to a second supply having a second voltage level (e.g., VDD2) different from the first voltage level. BM01 and BM02 are separated by one of the distance equal to the BMOS of FIG. 1B or a second distance equal to the BMOS multiplied by a shrink factor. In some embodiments, the distance between BM01 and BM02 is less than a minimum n-well to n-well spacing.

The structure 100E includes a second layer L2 including nano-sheet transistors NST1 and NST2 (collectively, "NST"). NST1 and NST2 are separated by one of the distance equal to the NSTS of FIG. 1B or a second distance equal to the NSTS multiplied by a shrink factor. In some embodiments, a dielectric structure DI (e.g., the DI with respect to FIG. 5B) is disposed in between NST1 and NST2. In some embodiments, DI extends in the X direction. In some embodiments, DI abuts with NST1 in the Z direction, and DI abuts with NST2 in the Z direction. In some embodiments, a gate structure G is disposed in between NST1 and NST2. In some embodiments, G extends in the X direction. In some embodiments, G abuts with NST1 in the Y direction, and G abuts with NST2 in the Y direction. In some embodiments, G is surrounded or substantially surrounded by dielectric structure DI, such that DI is in between NST1 and NST2. In some embodiments, the distance between NST1 and NST2 is less than a minimum n-well to n-well spacing.

Each NST includes active area AA. The AA includes source/drain (S/D) structures S and D. An S/D structure (e.g., S) is a semiconductor structure within the AA and configured to have a doping type opposite to that of other S/D structures (e.g., D) of the AA. Pairs of S/D structures are aligned with each other (e.g., are separated by a distance, offset from each other, adjacent to, etc.) in the first direction (e.g., X direction). In some embodiments, an S/D structure is configured to have lower resistivity than other portions of the AA, e.g., by including one or more portions having doping concentrations greater than one or more doping concentrations otherwise present throughout the AA. In various embodiments, S/D structures include epitaxial regions of a semiconductor material, e.g., silicon (Si), boron (B), phosphorus (P), germanium (Ge), carbon (C), SiGe, and/or SiC. In an IC layout diagram, an S/D structure is defined by an S/D region.

Each NST includes a nano-sheet gate NSG in between each pair of S/D structures of opposite types. Each NSG is layered in a third direction (e.g., the Z direction) perpendicular to both the first direction and the second direction. Each NSG includes alternating layers of gate structure G and a channel structure CH extending in the first direction. Although not shown in FIG. 1E, each CH is surrounded on four sides by G (e.g., in the second and third directions).

A gate structure G is a volume including one or more conductive segments including one or more conductive materials, e.g., polysilicon, one or more metals, and/or one or more other suitable materials, surrounded or substantially surrounded by a dielectric structure DI composed of one or more dielectric materials, e.g., silicon dioxide and/or one or more other suitable materials, the one or more conductive segments thereby being configured to control a voltage provided to underlying and adjacent dielectric layers. In various embodiments, a dielectric layer includes one or more of silicon dioxide and/or a high-k dielectric material, e.g., a dielectric material having a k value higher than 3.8 or 7.0. In some embodiments, a high-k dielectric material includes aluminum oxide, hafnium oxide, lanthanum oxide, or another suitable material. In an IC layout diagram, a gate structure G is defined by a gate region.

A channel structure CH is a volume including epitaxial regions of a semiconductor material, e.g., silicon (Si), boron (B), phosphorus (P), germanium (Ge), carbon (C), SiGe, and/or SiC. In some embodiments, CH has doping concentrations less than one or more doping concentrations otherwise present in the S/D structures. In an IC layout diagram, a channel structure CH is defined by an channel region.

The structure 100E includes a third layer L3 including backside vias VBs in between the first layer and the second layer. A first VB couples BM01 to NST1 and a second VB couples BM02 to NST2.

The structure 100E includes a fourth layer L4 including frontside vias VDs in over the second layer. As described below with respect to FIGS. 3A-3C, VDs couple NSTs to frontside metals MOs.

The structure 100E includes a fifth layer L5 composed of one or more dielectric materials, e.g., silicon dioxide ($SiO_2$). The fifth layer surrounds (e.g., over, under, and on either side) NSTs of the second layer. Portions of the fifth layer are in between the first layer and the second layer.

In some embodiments, the structure 100E includes a sixth layer L6 below the first layer including backend vias BV0. In some embodiments, the structure 100E includes a seventh layer L7 below the sixth layer, including backend metals BM1. In some embodiments, the structure 100E includes an eighth layer L8 including redistribution layer metals RDL. The RDL is coupled to the backend metals using vias. In some embodiments, the structure 100E includes an ninth layer L9 including bumps. The bumps are coupled to the RDL.

Figure 2:
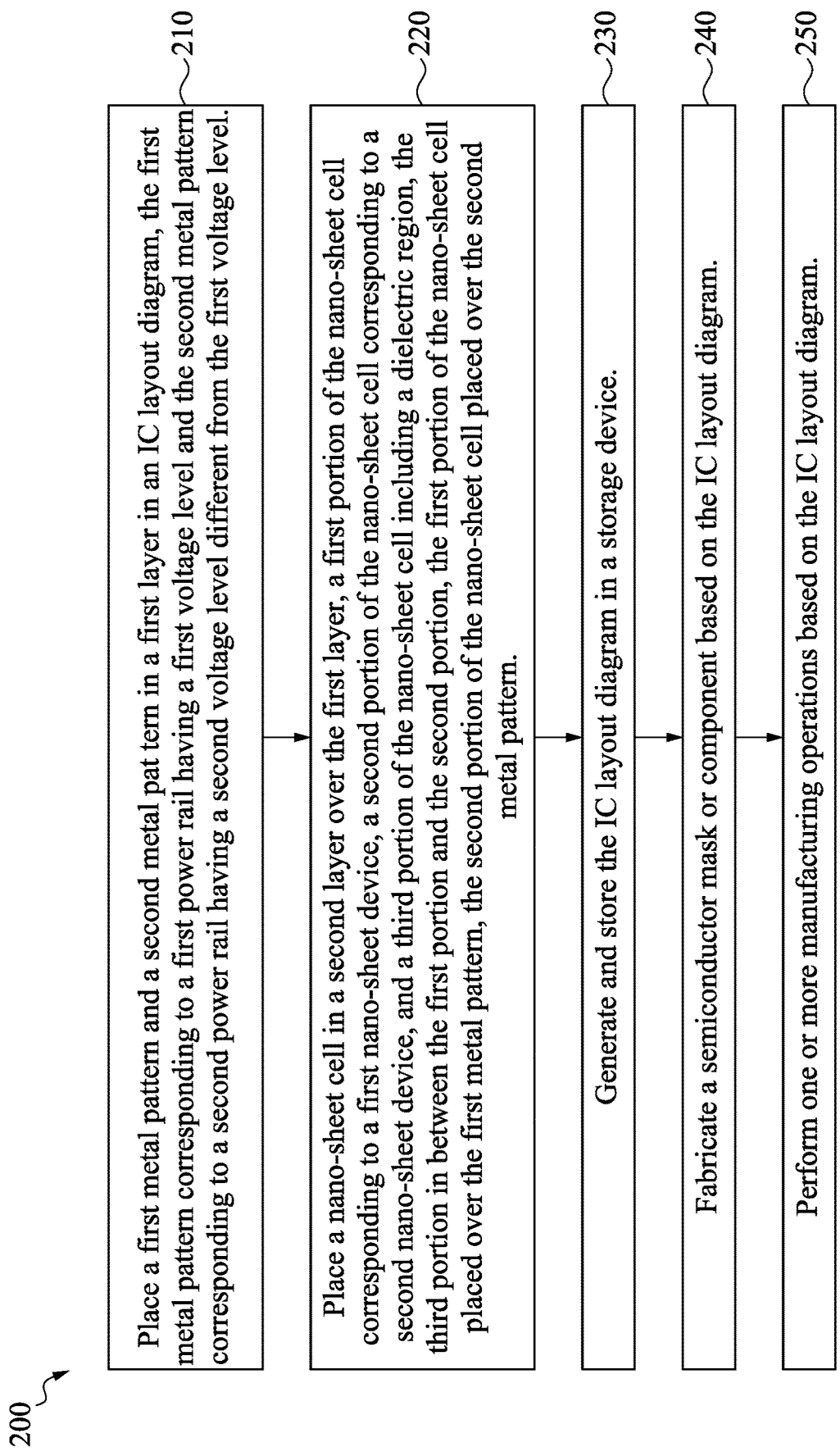
FIG. 2 is a flowchart of a method of operating an IC manufacturing system, in accordance with some embodiments.

FIG. 2 is a flowchart of a method 200 of operating an IC manufacturing system, in accordance with some embodiments. In some embodiments, operating the IC manufacturing system includes generating an IC layout diagram, e.g., IC layout diagram 100A-100B, 300A-300B, 500A, and 600A discussed above with respect to FIGS. 1A-1B, 3A-3B, 5A, and 6A corresponding to an IC structure manufactured based on the generated IC layout diagram as part of an IC device. Non-limiting examples of IC devices include memory circuits, logic devices, processing devices, signal processing circuits, or the like.

In some embodiments, some or all of method 200 is executed by a processor of a computer. In some embodiments, some or all of method 200 is executed by a processor 902 of an IC layout diagram generation system 900, discussed below with respect to FIG. 9.

Some or all of the operations of method 200 are capable of being performed as part of a design procedure performed in a design house, e.g., a design house 1020 discussed below with respect to FIG. 10.

In some embodiments, the operations of method 200 are performed in the order depicted in FIG. 2. In some embodiments, the operations of method 200 are performed simultaneously and/or in an order other than the order depicted in FIG. 2. In some embodiments, one or more operations are performed before, between, during, and/or after performing one or more operations of method 200.

At operation 210, a first metal pattern, such as BM0R1, and a second metal pattern, such as BMOR2, are placed in a first layer in an IC layout diagram. The first metal pattern corresponds to a first supply (e.g., power rail) having a first voltage level and the second metal pattern corresponds to a second supply (e.g., power rail) having a second voltage level different from the first voltage level.

At operation 220, a nano-sheet cell, such as C1, is placed in a second layer over the first layer. A first portion of the nano-sheet cell, such as NSTR1, corresponds to a first nano-sheet device (e.g., structure) and a second portion of the nano-sheet cell, such as NSTR2, corresponds to a second nano-sheet device. The first portion of the nano-sheet cell is placed over the first metal pattern. The second portion of the nano-sheet cell is placed over the second metal pattern. A third portion of the nano-sheet cell includes a dielectric region. The third portion of the nano-sheet cell is in between the first portion of the nano-sheet cell and the second portion of the nano-sheet cell. In some embodiments, the third portion includes a gate region. In some embodiments, the gate region is surrounded or substantially surrounded by the dielectric region. In some embodiments, a distance, such as NSTS, between the first portion of the nano-sheet cell and the second portion of the nano-sheet cell is less than a minimum n-well to n-well spacing. In some embodiments, an n-well region is placed in an n-well layer in between the first layer and the nano-sheet cell. In some embodiments, the nano-sheet cell shares the same n-well region.

In some embodiments, a third metal pattern, such as BMOR3 is placed in the first layer and adjacent to the first metal pattern. The third metal pattern corresponds to a ground rail. The third metal pattern is placed under a third portion of the nano-sheet cell, such as NSTR3, corresponding to a third nano-sheet device.

Figure 5A:
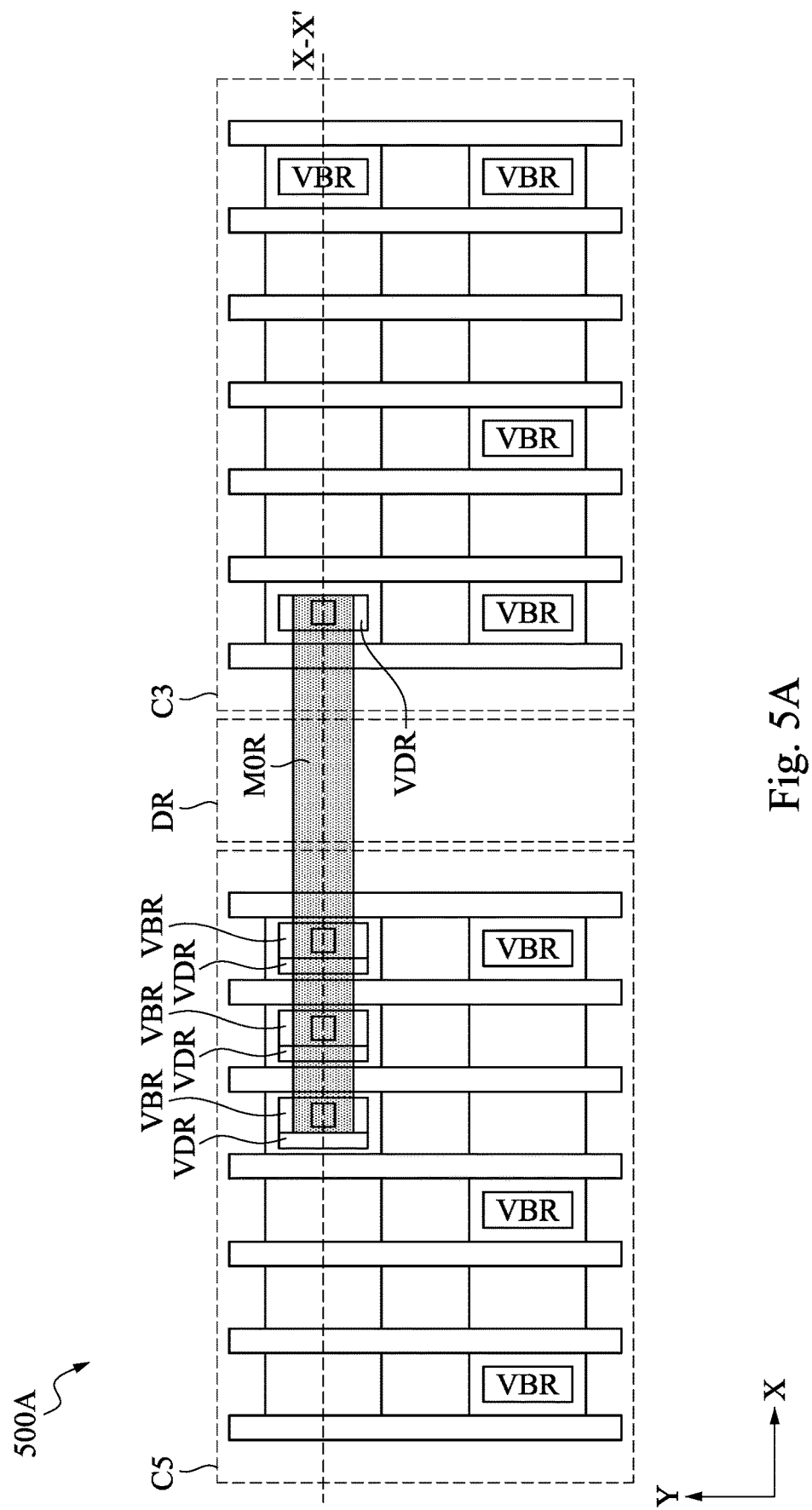
FIG. 5A depicts an IC layout diagram of two cells, in accordance with some embodiments.

In some embodiments, a fourth metal pattern, such as MOR with respect to FIG. 5A, is placed in a third layer over the second layer. The fourth metal pattern corresponds to a frontend metal structure. In some embodiments, a second nano-sheet cell (e.g., a pickup cell), such as C5 with respect to FIG. 5A, is placed in the second layer. The second nano-sheet cell is placed in between the fourth metal pattern and the second metal pattern. The second nano-sheet cell corresponds to a dummy nano-sheet device. Thus, in some embodiments, the IC structure defined by the IC layout diagram couples the first supply through the backend metal (e.g., the second metal pattern), through the dummy nano-sheet device, through the frontend metal (e.g., the fourth metal pattern), to the second portion of the nano-sheet device. In some embodiments, the second nano-sheet cell includes an active region, such as AR, in between the fourth metal pattern and the second metal pattern. In some embodiments, the dummy nano-sheet device includes a thru via region, such as VTR, in between the fourth metal pattern and the second metal pattern.

In some embodiments a first via region, such as VBR, is placed in a fourth layer between the first layer and the second layer. The first via region is between (e.g., intersects, overlaps) the first metal pattern and the first portion of the nano-sheet cell. In some embodiments, a fifth layer is placed in between the first layer and the second layer, the fifth layer composed of oxide, such as $SiO_2$. In some embodiments, the fifth layer surrounds the nano-sheet cell of the first layer. In some embodiments, the first and second portions of the nano-sheet cell operate as part of a level shifter circuit, wherein the first portion is in one power domain and the second portion is in a second power domain different from the first power domain.

At operation 230, in some embodiments, the IC layout diagram is generated and stored in a storage device. Generating the IC layout diagram is performed by a processor, e.g., processor 902 of IC layout diagram generation system 900 discussed below with respect to FIG. 9. In some embodiments, generating the IC layout diagram includes generating some or all of IC design layout diagram 1022 discussed below with respect to FIG. 10.

In various embodiments, storing the IC layout diagram in the storage device includes storing the IC layout diagram in a non-volatile, computer-readable memory or a cell library, e.g., a database, and/or includes storing the IC layout diagram over a network. In various embodiments, storing the IC layout diagram in the storage device includes storing the IC layout diagram in cell library 920 or over network 914 of IC layout diagram generation system 900, discussed below with respect to FIG. 9.

In various embodiments, generating and storing the IC layout diagram includes generating and storing one or more of IC layout diagrams 100A, 100B discussed below with respect to FIGS. 1A-1B.

At operation 240, in some embodiments, at least one of one or more semiconductor masks, or at least one component in a layer of a semiconductor IC is fabricated based on the IC layout diagram. Fabricating one or more semiconductor masks or at least one component in a layer of a semiconductor IC is discussed below with respect to IC manufacturing system 1000 and FIG. 10.

In various embodiments, fabricating one or more semiconductor masks or at least one component in the layer of the semiconductor IC is based on one or more of IC layout diagrams 100A, 100B discussed below with respect to FIGS. 1A-1B.

At operation 250, in some embodiments, one or more manufacturing operations are performed based on the IC layout diagram. In some embodiments, performing one or more manufacturing operations includes performing one or more lithographic exposures based on the IC layout diagram. Performing one or more manufacturing operations, e.g., one or more lithographic exposures, based on the IC layout diagram is discussed below with respect to FIG. 10.

In various embodiments, performing one or more manufacturing operations is based on one or more of IC layout diagrams 100A, 100B discussed below with respect to FIGS. 1A-1B.

Figure 3B:
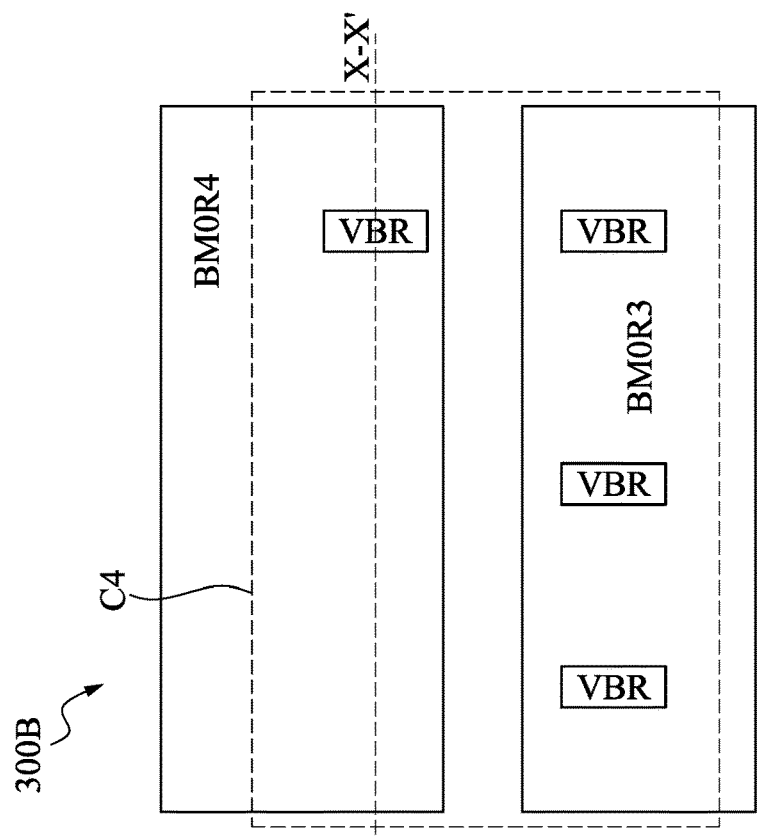
FIG. 3B depicts an IC layout diagram of a cell, in accordance with some embodiments.
Figure 3A:
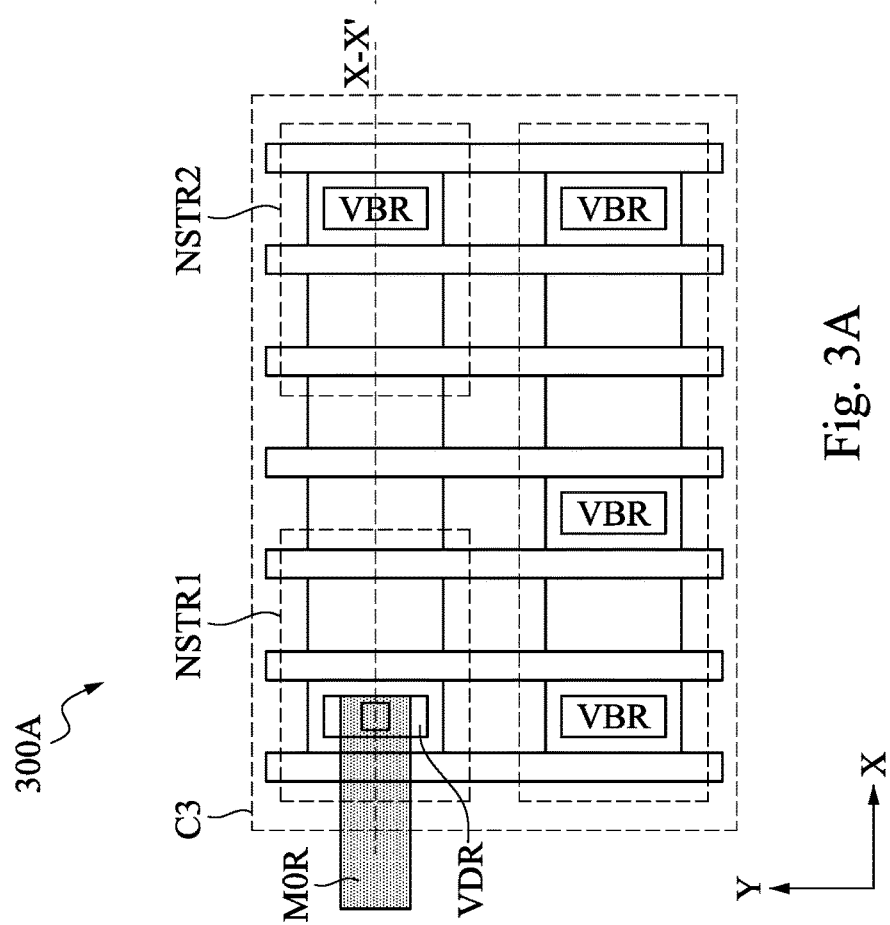
FIG. 3A depicts an IC layout diagram of a cell, in accordance with some embodiments.

FIG. 3A depicts an IC layout diagram 300A of a cell C3, in accordance with some embodiments. FIG. 3A is a depiction of non-limiting example of an IC layout diagram 300A generated by executing one or more operations of method 400 as discussed below, in some embodiments.

The IC layout diagram 300A of the cell C3 is similar to the IC layout diagram 100A of the cell C1. The cell C3 includes the first and second layers of C1. In some embodiments, the cell C3 includes a third layer over the second layer (e.g., the layer of NSGRs) including frontside via regions VDRs. The VDRs are placed in between NSGRs in the first direction, extend in the second direction, and overlap the AR. In some embodiments, VDR is a layer over the layers of cell C3 (e.g., VDR is not part of the cell C3). The frontside via region VDR defines a via structure similar to that described with respect to FIGS. 1A-1B.

In some embodiments, the cell C3 includes a fourth layer over the third layer. The fourth layer includes a metal region MOR corresponding to a metal structure that is coupled to the first supply having a first voltage level. In some embodiments, MOR is a layer over the layers of cell C3 (e.g., MOR is not part of the cell C3). The metal region MOR defines a metal structure similar to that described with respect to FIGS. 1A-1B.

FIG. 3B depicts an IC layout diagram 300B of a cell C4, in accordance with some embodiments. FIG. 3B is a depiction of non-limiting example of an IC layout diagram 300B generated by executing one or more operations of method 400 as discussed below, in some embodiments. The cell C3 is placed (e.g., formed) over C4 (e.g., the cell C3 is a first cell layer over C4, which is the second cell layer). A VBR layer is included in between C3 and C4, similar to the VBR layer with respect to FIGS. 1A-1B.

The IC layout diagram 300B of the cell C4 is similar to the IC layout diagram 100A of the cell C2. The cell C4 includes a layer (e.g., the third layer) including backend metal regions BMOR3 and BMOR4 (collectively, "BMOR"). BMOR3 and BMOR4 are similar to BM0R1, BMOR2, and BMOR3 of C2. BMOR4 corresponds to a metal structure that is coupled to the second supply having a second voltage level (e.g., VDD2). BMOR4 extends in the first direction. In some embodiments, a length in the second direction of BMOR4 is equal to a length of BM0R1+BM0S+BMOR2 with respect to FIG. 1B.

Figure 3C:
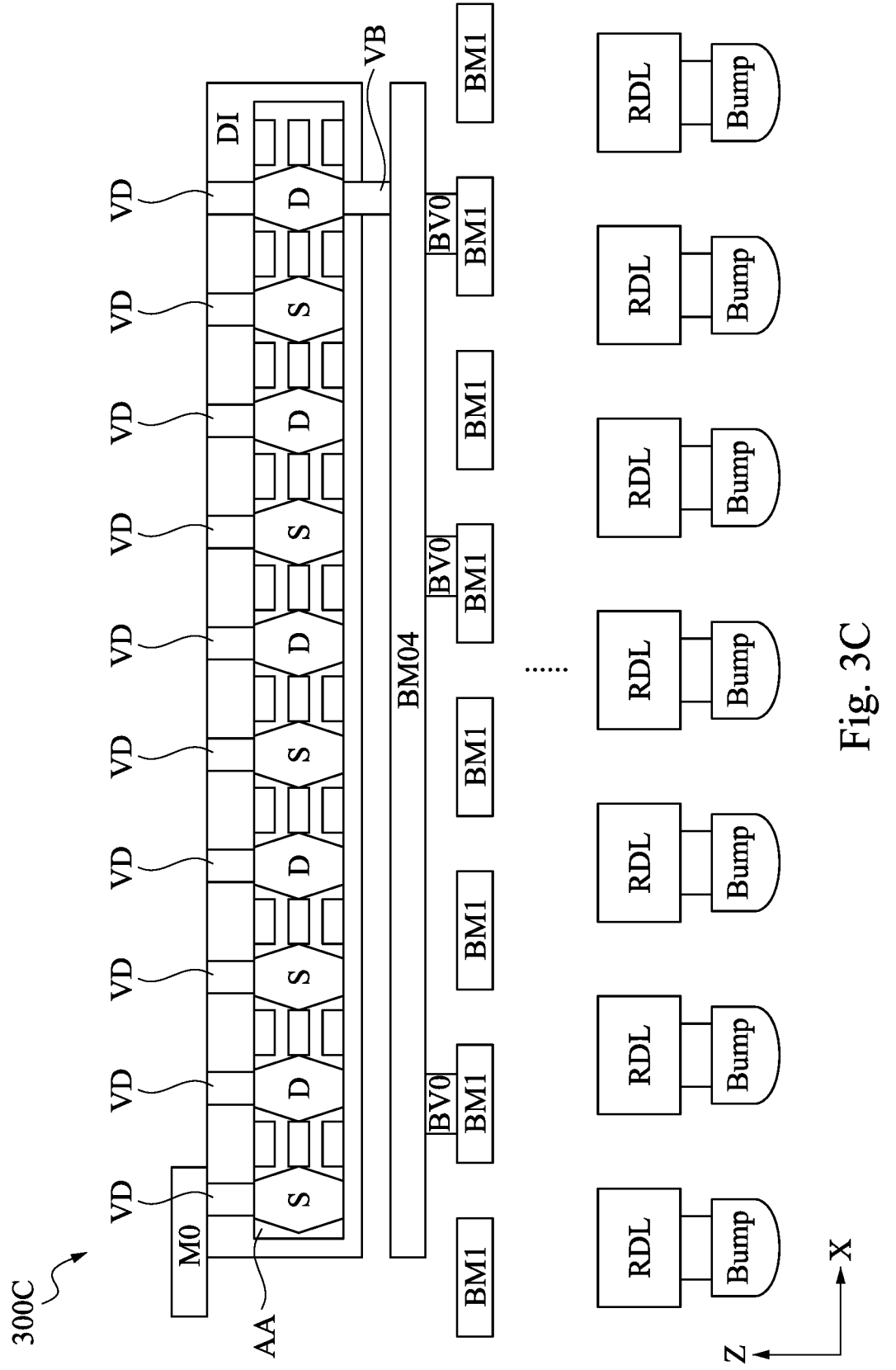
FIG. 3C depicts an IC structure, in accordance with some embodiments.

FIG. 3C depicts an IC structure 300C, in accordance with some embodiments. The IC structure 300C is an x-x' cross sectional view of IC structures defined by the IC layout diagrams 300A and 300B, with additional details, in accordance with some embodiments. The IC structure 300C is similar to the IC structure 100E with respect to FIG. 1E. The IC structure 300C includes a first layer including backend metal structure BM04 that is coupled to a second supply having a second voltage level (e.g., VDD2) different from the first voltage level. The IC structure 300C includes the second-to-ninth layers of FIG. 1E. The IC structure 300C includes a tenth layer over the fourth layer (the VD layer). The tenth layer includes a metal structure MO corresponding to a metal structure that is coupled to the first supply having a first voltage level (e.g., VDD1) different from the second voltage level.

Figure 4:
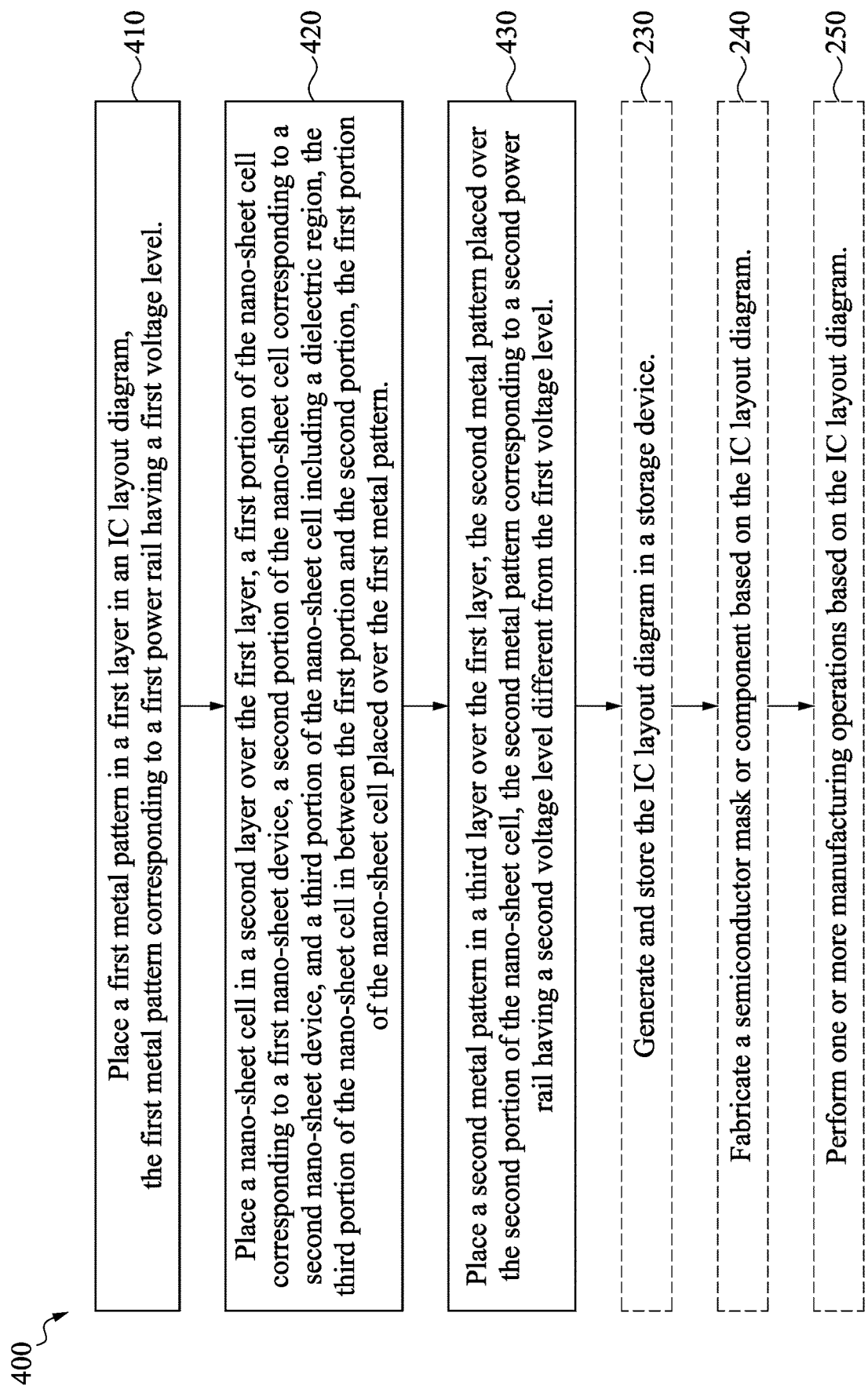
FIG. 4 is a flowchart of a method of operating an IC manufacturing system, in accordance with some embodiments.

FIG. 4 is a flowchart of a method 400 of operating an IC manufacturing system, in accordance with some embodiments. In some embodiments, operating the IC manufacturing system includes generating an IC layout diagram, e.g., IC layout diagram 100A-100B, 300A-300B, 500A, and 600A discussed above with respect to FIGS. 1A-1B, 3A-3B, 5A, and 6A corresponding to an IC structure manufactured based on the generated IC layout diagram as part of an IC device. Non-limiting examples of IC devices include memory circuits, logic devices, processing devices, signal processing circuits, or the like.

In some embodiments, some or all of method 400 is executed by a processor of a computer. In some embodiments, some or all of method 400 is executed by a processor 902 of an IC layout diagram generation system 900, discussed below with respect to FIG. 9.

Some or all of the operations of method 400 are capable of being performed as part of a design procedure performed in a design house, e.g., a design house 1020 discussed below with respect to FIG. 10.

In some embodiments, the operations of method 400 are performed in the order depicted in FIG. 4. In some embodiments, the operations of method 400 are performed simultaneously and/or in an order other than the order depicted in FIG. 4. In some embodiments, one or more operations (e.g., operations of method 200) are performed before, between, during, and/or after performing one or more operations of method 400.

At operation 410, a first metal pattern, such as BMOR4, is placed in a first layer in an IC layout diagram. The first metal pattern corresponds to a first power rail having a first voltage level.

At operation 420, a nano-sheet cell, such as C1 or C3, is placed in a second layer over the first layer. A first portion of the nano-sheet cell, such as NSTR2, corresponds to a first nano-sheet device and a second portion of the nano-sheet cell, such as NSTR1, corresponds to a second nano-sheet device. The first portion of the nano-sheet cell is placed over the first metal pattern. A third portion of the nano-sheet cell includes a dielectric region. The third portion of the nano-sheet cell is in between the first portion of the nano-sheet cell and the second portion of the nano-sheet cell.

At operation 430, a second metal pattern, such as MOR, is placed in a third layer over the first layer. The second metal pattern is placed over the second portion of the nano-sheet cell. The second metal pattern corresponds to a second power rail having a second voltage level different from the first voltage level. In some embodiments, a distance, such as NSTS, between the first portion of the nano-sheet cell and the second portion of the nano-sheet cell is less than a minimum n-well to n-well spacing.

Figure 5B:
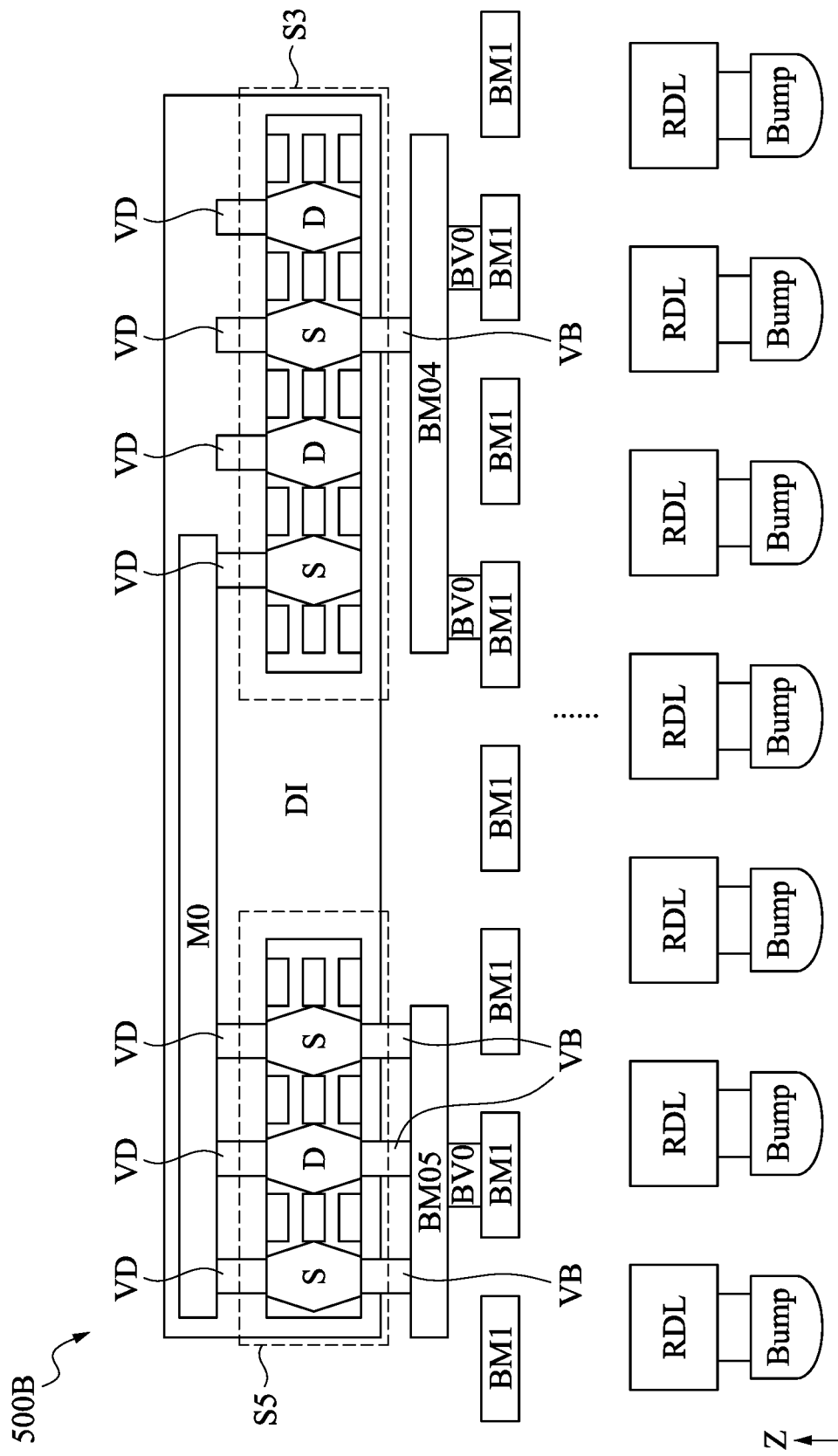
FIG. 5B depicts an IC structure, in accordance with some embodiments.

In some embodiments, a third metal pattern, such as BMOR5 with respect to FIG. 5B, is placed in the first layer and adjacent to the first metal pattern. The third metal pattern corresponds to the second power rail. In some embodiments, a second nano-sheet cell, such as C5 with respect to FIGS. 5A-5B, is placed in the second layer. In some embodiments, the second nano-sheet cell is placed in between the third metal pattern and the second metal pattern. The second nano-sheet cell corresponds to a dummy nano-sheet device.

In some embodiments a first via region, such as VBR, is placed in a fourth layer between the first layer and the second layer. The first via region is between the first metal pattern and the first portion of the nano-sheet cell. In some embodiments, a second via region, such as VDR, is placed in a fifth layer between the second layer and the third layer, the second via region between the second metal pattern and the second portion of the nano-sheet cell.

FIG. 5A depicts an IC layout diagram 500A of two cells C3 and C5, in accordance with some embodiments. FIG. 5A is a depiction of non-limiting example of an IC layout diagram 500A generated by executing one or more operations of methods 200 or 400 as discussed below, in some embodiments.

The IC layout diagram 500A of the cell C3 is similar to the IC layout diagram 300A of the cell C3. The cells C3 and C5 are separated by a distance in the first direction. A layer of MOR extends in the first direction and overlaps both of the cells C3 and C5. The IC layout diagram 500A of the cell C5 is similar to the IC layout diagram 300A of the cell C3. MOR is placed over VDRs of C5, which are placed over AR of C5, which are placed above VBRs of C5. Thus, at least a portion of the cell C5 (e.g., the portion including the VDRs over the VBRs) defines a dummy nano-sheet transistor structure used to couple a supply from backend metals to the front end metals and other nano-sheet transistor cells.

FIG. 5B depicts an IC structure 500B, in accordance with some embodiments. The IC structure 500B is an x-x' cross sectional view of IC structures defined by the IC layout diagram 500A, with additional details, in accordance with some embodiments. The IC structure 500B is similar to the IC structure 300C with respect to FIG. 3C. The first layer of the IC structure 500B includes backend metal structures BM04 and BM05. BM04 is coupled to a supply having a first voltage and BM05 is coupled to a supply having a second voltage different from the first voltage. The second layer over the first layer includes structures S3 and S5. S3 is defined by the cell C3 and S5 is defined by the cell C5. S3 includes one or more NSTs coupled to BM04. S5 includes one or more dummy NSTs coupled to BM05. The tenth layer over the second layer includes MO coupled to the one or more NSTs of S3 and the one or more dummy NSTs of S5. Thus, both of the first and second supplies are coupled through backend metals to the one or more NSTs of S3.

Figure 6B:
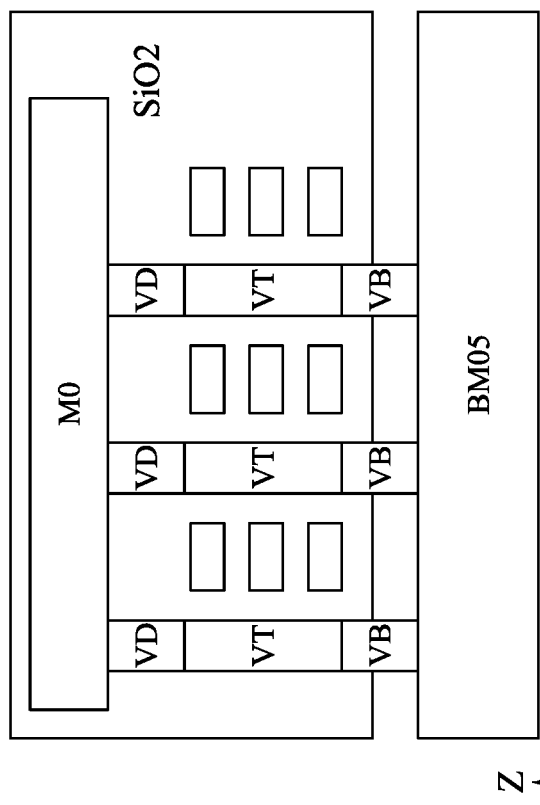
FIG. 6B depicts an IC structure, in accordance with some embodiments.
Figure 6A:
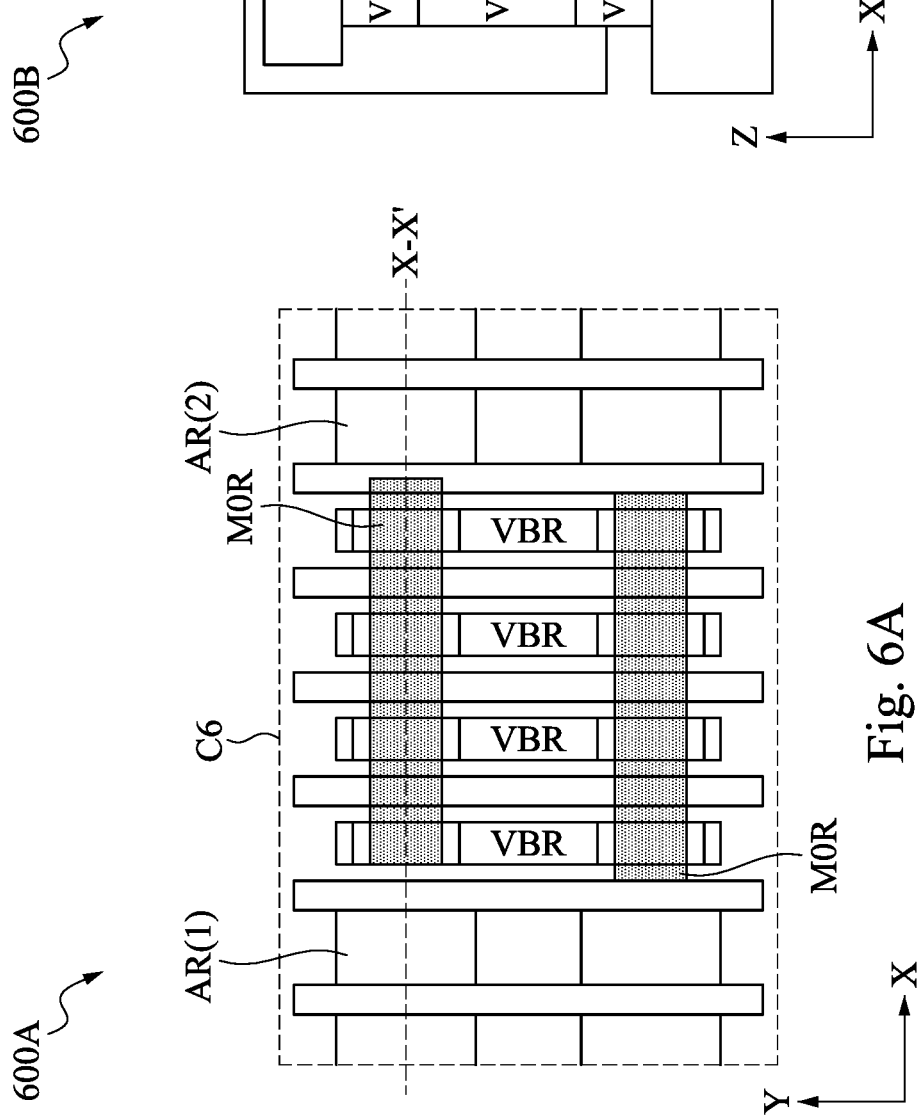
FIG. 6A depicts an IC layout diagram of a cell, in accordance with some embodiments.

FIG. 6A depicts an IC layout diagram 600A of a cell C6, in accordance with some embodiments. FIG. 6A is a depiction of non-limiting example of an IC layout diagram 600A generated by executing one or more operations of methods 200 or 400 as discussed below, in some embodiments.

The IC layout diagram 600A of the cell C6 is similar to the IC layout diagram 500A of the cell C5. The cell C6 includes a first AA portion AR(1) extending in the first direction, and a second AA portion AR(2) separated from AR(1) by a distance in the first direction and extending in the first direction. The VBRs and VDRs are placed in between AR(1) and AR(2) in the first direction. MO is placed over the VDRs.

FIG. 6B depicts an IC structure 600B, in accordance with some embodiments. The IC structure 600B is an x-x' cross sectional view of IC structures defined by the IC layout diagram 600A, with additional details, in accordance with some embodiments. The IC structure 600B is similar to the IC structure S5 (e.g., the one or more dummy NSTs) with respect to FIG. 5B. The IC structure 600B includes a layer of thru vias VTs. The AA does not intersect with the VTs. In some embodiments, AA is on either side of the VTs, in the first direction. The layer of VTs are over a layer of VBs of IC structure 600B and under a layer of VDs of IC structure 600B. One or more of the VTs couples one or more of the VBs to one or more of the VDs. Thus, a backend metal BM05 of IC structure 600B is coupled to VB, which is coupled to VT, which is coupled to VD, which is coupled to an MO of IC structure 600B. VT is defined by a VT region (VTR) in an IC layout.

Figure 7:
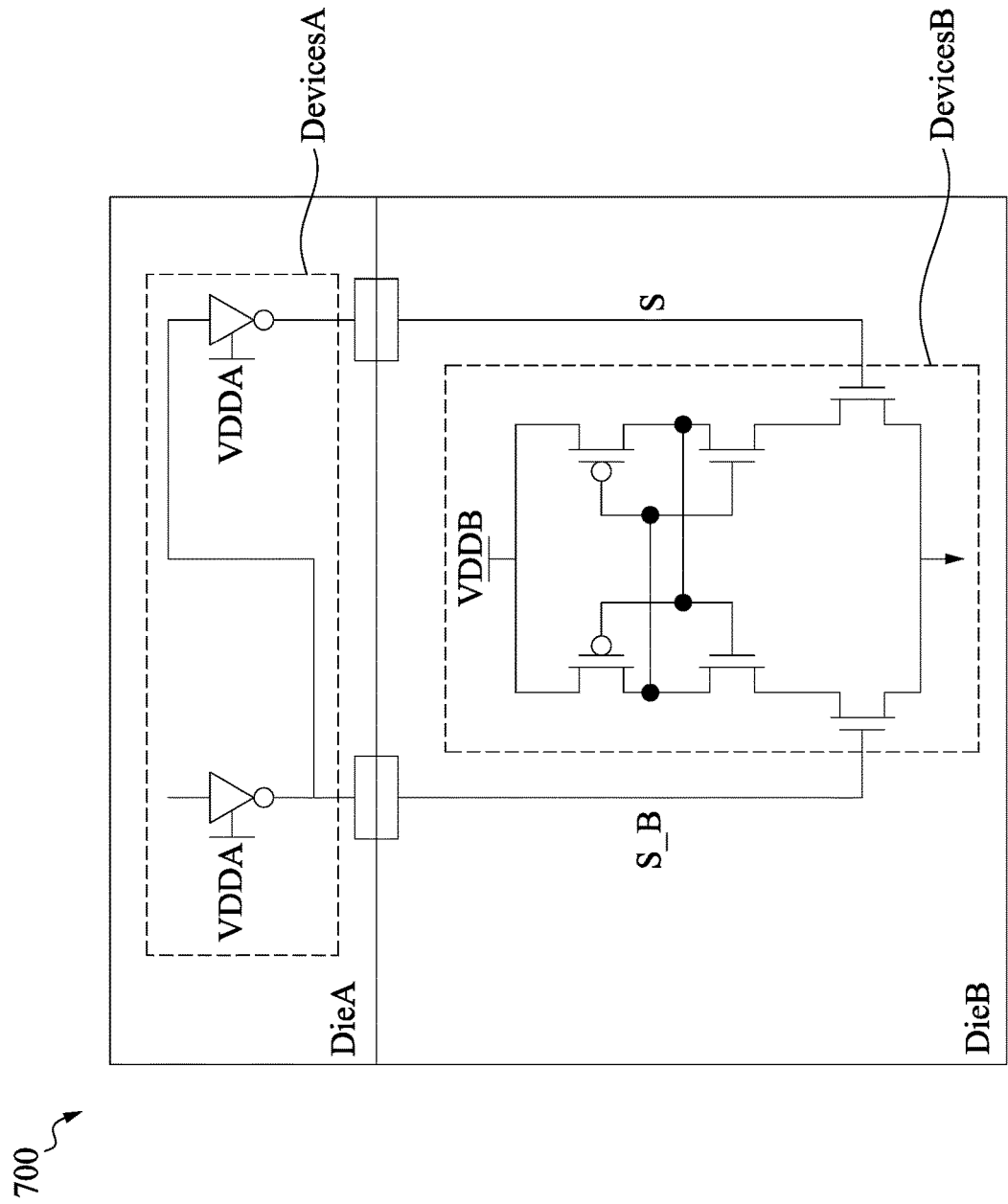
FIG. 7 depicts an IC circuit schematic diagram representing an IC module.

FIG. 7 depicts an IC circuit schematic diagram 700 representing an IC module. The IC circuit schematic diagram 700 includes a representation of a first die (DieA) including a representation of first nano-sheet devices (DevicesA) coupled to a first power supply having a first voltage level (e.g., VDDA). The first nano-sheet devices generate complementary signals, S and S B. In some embodiments, the representation of first nano-sheet devices include inverters. In some embodiments, the first nano-sheet devices or operate as a first part of a level shifter circuit (e.g., inverters or cascaded inverters). The IC circuit schematic diagram 700 includes including a representation of a second die (DieB) including a representation of second nano-sheet devices (DevicesB) coupled to a second power supply having a second voltage level (e.g., VDDB) different from the first voltage level. The second nano-sheet devices receive the complementary signals. In some embodiments, second nano-sheet devices operate as a second part of a level shifter circuit.

Figure 8:
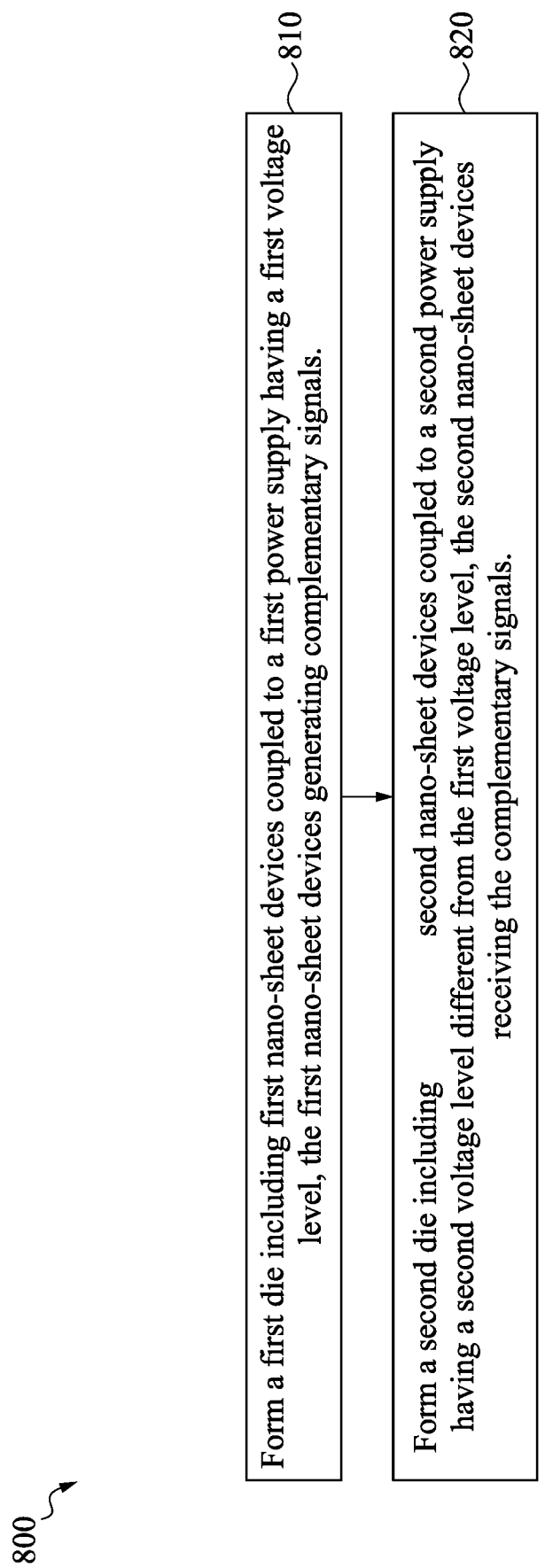
FIG. 8 is a flowchart of a method of operating an IC manufacturing system, in accordance with some embodiments.

FIG. 8 is a flowchart of a method 800 of operating an IC manufacturing system, in accordance with some embodiments. In some embodiments, operating the IC manufacturing system includes generating an IC layout diagram, e.g., IC layout diagram 100A-100B, 300A-300B, 500A, and 600A discussed above with respect to FIGS. 1A-1B, 3A-3B, 5A, and 6A, or generating an IC layout diagram based on an IC circuit schematic diagram such as the IC circuit schematic diagram 700, corresponding to an IC structure manufactured based on the generated IC layout diagram as part of an IC device. Non-limiting examples of IC devices include memory circuits, logic devices, processing devices, signal processing circuits, or the like.

In some embodiments, some or all of method 800 is executed by a processor of a computer. In some embodiments, some or all of method 800 is executed by a processor 902 of an IC layout diagram generation system 900, discussed below with respect to FIG. 9.

Some or all of the operations of method 800 are capable of being performed as part of a design procedure performed in a design house, e.g., a design house 1020 discussed below with respect to FIG. 10.

In some embodiments, the operations of method 800 are performed in the order depicted in FIG. 8. In some embodiments, the operations of method 800 are performed simultaneously and/or in an order other than the order depicted in FIG. 8. In some embodiments, one or more operations (e.g., operations of method 200 or 400) are performed before, between, during, and/or after performing one or more operations of method 800.

At operation 810, a first die is formed including first nano-sheet devices coupled to a first power supply having a first voltage level, the first nano-sheet devices generating complementary signals. In some embodiments, the first nano-sheet devices operate as part of inverters.

At operation 820, a second die is formed including second nano-sheet devices coupled to a second power supply having a second voltage level different from the first voltage level, the second nano-sheet devices receiving the complementary signals. In some embodiments, the second nano-sheet devices operate as part of a level shifter circuit. In some embodiments, at least one of the first and second nano-sheet devices receive their first and second power supply signals through back-end metals. In some embodiments, at least one of the first and second nano-sheet devices receive their first and second power supply signals through front-end metals.

Figure 9:
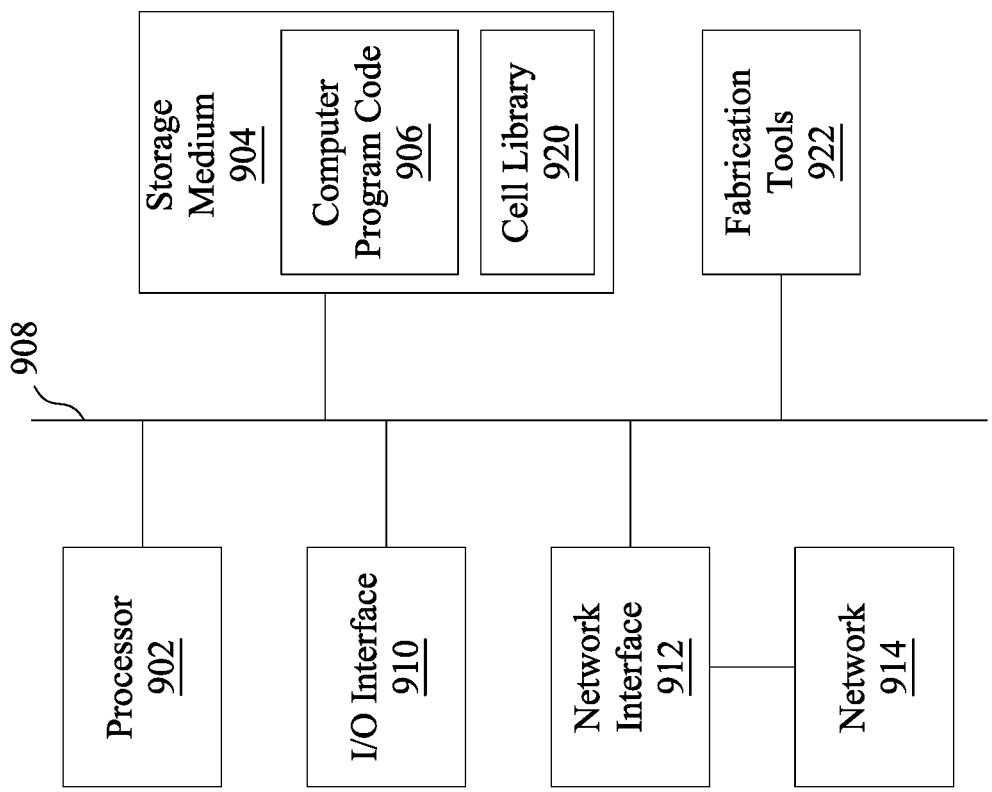
FIG. 9 is a block diagram of IC layout diagram generation system, in accordance with some embodiments.

FIG. 9 is a block diagram of IC layout diagram generation system 900, in accordance with some embodiments. In some embodiments, IC layout diagram generation system 900 includes an electronic design automation (EDA). In some embodiments, IC layout diagram generation system 900 includes or is part of an APR system. Methods described herein of designing IC layout diagrams representing fin arrangements, in accordance with one or more embodiments, are implementable, for example, IC layout diagram generation system 900, in accordance with some embodiments.

In some embodiments, IC layout diagram generation system 900 is a general purpose computing device including processor 902 and a non-transitory, computer-readable storage medium 904. Computer-readable storage medium 904, amongst other things, is encoded with, i.e., stores, computer program code 906, i.e., a set of executable instructions. Execution of instructions 906 by processor 902 represents (at least in part) an IC layout diagram generation tool which implements a portion or all of, e.g., method 200 discussed above with respect to FIG. 2, method 400 discussed above with respect to FIG. 4, and/or method 800 discussed above with respect to FIG. 8 (hereinafter, the noted processes and/or methods).

Processor 902 is electrically coupled to computer-readable storage medium 904 via a bus 908. Processor 902 is also electrically coupled to an I/O interface 910 by bus 908. A network interface 912 is also electrically connected to processor 902 via bus 908. Network interface 912 is connected to a network 914, so that processor 902 and computer-readable storage medium 904 are capable of connecting to external elements via network 914. Processor 902 is configured to execute computer program code 906 encoded in computer-readable storage medium 904 in order to cause IC layout diagram generation system 900 to be usable for performing a portion or all of the noted processes and/or methods. In one or more embodiments, processor 902 is a central processing unit (CPU), a multi-processor, a distributed processing system, an application specific integrated circuit (ASIC), and/or a suitable processing unit.

In one or more embodiments, computer-readable storage medium 904 is an electronic, magnetic, optical, electromagnetic, infrared, and/or a semiconductor system (or apparatus or device). For example, computer-readable storage medium 904 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 904 includes a compact disk-read only memory (CD-ROM), a compact disk-read/write (CD-R/W), and/or a digital video disc (DVD).

In one or more embodiments, computer-readable storage medium 904 stores computer program code 906 configured to cause IC layout diagram generation system 900 (where such execution represents (at least in part) the IC layout diagram generation tool) to be usable for performing a portion or all of the noted processes and/or methods. In one or more embodiments, computer-readable storage medium 904 also stores information which facilitates performing a portion or all of the noted processes and/or methods. In one or more embodiments, computer-readable storage medium 904 stores library 920 of standard cells including IC layout diagrams as disclosed herein, e.g., one or more of IC layout diagram 100A-100B, 300A-300B, 500A, and 600A discussed above with respect to FIGS. 1A-1B, 3A-3B, 5A, and 6A.

IC layout diagram generation system 900 includes I/O interface 910. I/O interface 910 is coupled to external circuitry. In one or more embodiments, I/O interface 910 includes a keyboard, keypad, mouse, trackball, trackpad, touchscreen, and/or cursor direction keys for communicating information and commands to processor 902.

IC layout diagram generation system 900 also includes network interface 912 coupled to processor 902. Network interface 912 allows IC layout diagram generation system 900 to communicate with network 914, to which one or more other computer systems are connected. Network interface 912 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more IC layout diagram generation systems 900.

IC layout diagram generation system 900 is configured to receive information through I/O interface 910. The information received through I/O interface 910 includes one or more of instructions, data, design rules, libraries of standard cells, and/or other parameters for processing by processor 902. The information is transferred to processor 902 via bus 908. IC layout diagram generation system 900 is configured to receive information related to a user interface (UI) through I/O interface 910.

In some embodiments, the system 900 may also be associated with various fabrication tools 922. Among other things, the fabrication tools 922 may be used to prepare and fabricate a set of masks based on the standard cell layout created by a standard cell layout application. The set of masks may define the geometry for the photolithography steps used during semiconductor fabrication of the circuit.

To prepare a set of masks, the fabrication tools 922 may be used to translate the standard cell layout of the circuit into a representative data file ("RDF"). The RDF may then be used to fabricate a set of physical masks to fabricate the circuit.

In some embodiments, preparing the set of masks may include performing an optical proximity correction (OPC) using lithography enhancement techniques to compensate for image errors, such as those that can arise from diffraction, interference, other process effects and the like, in the standard cell layout. In some embodiments, a mask rule checker (MRC) of the fabrication tools 922 may check the standard cell layout that has undergone processes in OPC with a set of mask creation rules. The mask creation rules may contain certain geometric and/or connectivity restrictions to ensure sufficient margins, to account for variability in semiconductor manufacturing processes, and the like. In some embodiments, the MRC may modify the standard cell layout to compensate for limitations during the fabrication of the set of masks. In some embodiments, preparing the set of masks may also include resolution enhancement techniques (RET), such as off-axis illumination, sub-resolution assist features, phase-shifting masks, other suitable techniques, and the like or combinations thereof.

The preparation of the set of masks may further include, in some embodiments, lithography process checking (LPC) that may simulate processes implemented to fabricate the circuit. LPC may simulate these processes based on the standard cell layout to create a simulated manufactured device of the circuit. LPC may take into account various factors, such as aerial image contrast, depth of focus ("DOF"), mask error enhancement factor ("MEEF"), other suitable factors, and the like or combinations thereof, to simulate the fabrication of the circuit. In some embodiments, after a simulated manufactured device has been created by LPC, if the simulated device does not satisfy certain design rules, OPC and/or MRC may be repeated to further refine the standard cell layout.

To fabricate the set of masks, a mask writer may convert the RDF to an image on a substrate, such as a mask (reticle) or a semiconductor wafer. In some embodiments, an electron-beam (e-beam) or a mechanism of multiple e-beams may be used to form a mask pattern on a semiconductor wafer to form the mask. In some embodiments, the mask pattern may include one or more opaque regions and one or more transparent regions. A radiation beam, such as an ultraviolet (UV) beam, used to expose the image sensitive material layer (e.g., photoresist) which has been coated on the semiconductor wafer, may be blocked by the opaque regions and transmits through the transparent regions. In one example, the mask pattern may include a transparent substrate (e.g., fused quartz) and an opaque material (e.g., chromium) coated in the opaque regions to form the mask. In other embodiments, other or additional techniques may be used to fabricate the masks.

Once the masks are fabricated, a fabrication entity (e.g., a manufacturing facility or semiconductor foundry) may use the fabricated masks to fabricate the circuit. In some embodiments, fabricating the circuit may involve depositing one or material in/on a semiconductor wafer using the mask (or masks). The semiconductor wafer may include a silicon substrate or other substrate having material layers formed thereon. The semiconductor wafer may further include one or more of various doped regions, dielectric features, multilevel interconnects, and the like formed using one or more of the masks.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by IC layout diagram generation system 900. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 10:
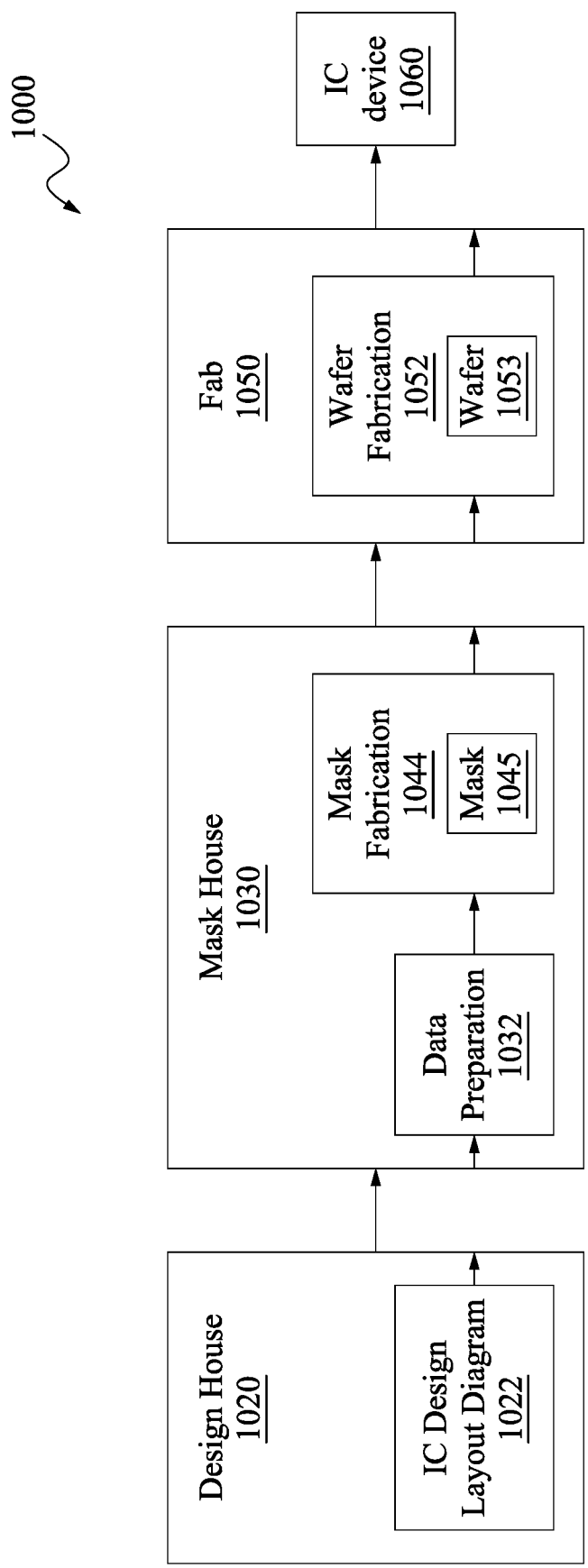
FIG. 10 is a block diagram of IC manufacturing system, and an IC manufacturing flow associated therewith, in accordance with some embodiments.

FIG. 10 is a block diagram of IC manufacturing system 1000, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 1000.

In FIG. 10, IC manufacturing system 1000 includes entities, such as a design house 1020, a mask house 1030, and an IC manufacturer/fabricator ("fab") 1050, that interact with one another in the design, development, and manufacturing cycles and/or services related to manufacturing an IC device 1060. The entities in system 1000 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1020, mask house 1030, and IC fab 1050 is owned by a single larger company. In some embodiments, two or more of design house 1020, mask house 1030, and IC fab 1050 coexist in a common facility and use common resources.

Design house (or design team) 1020 generates an IC design layout diagram 1022. IC design layout diagram 1022 includes various geometrical patterns, e.g., one or more of IC layout diagram 100A-100B, 300A-300B, 500A, and 600A discussed above with respect to FIGS. 1A-1B, 3A-3B, 5A, and 6A, designed for an IC device 1060, e.g., an IC device including IC structure 100C-100E, 300C, and 500B, discussed above with respect to FIGS. 1C-1E, 3C, and 5B. The geometrical patterns correspond to patterns of metal, oxide, or semiconductor layers that make up the various components of IC device 1060 to be fabricated. The various layers combine to form various IC features. For example, a portion of IC design layout diagram 1022 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1020 implements a proper design procedure to form IC design layout diagram 1022. The design procedure includes one or more of logic design, physical design, or place and route. IC design layout diagram 1022 is presented in one or more data files having information of the geometrical patterns. For example, IC design layout diagram 1022 can be expressed in a GDSII file format or DFII file format.

Mask house 1030 includes data preparation 1032 and mask fabrication 1044. Mask house 1030 uses IC design layout diagram 1022 to manufacture one or more masks 1045 to be used for fabricating the various layers of IC device 1060 according to IC design layout diagram 1022. Mask house 1030 performs mask data preparation 1032, where IC design layout diagram 1022 is translated into a representative data file ("RDF"). Mask data preparation 1032 provides the RDF to mask fabrication 1044. Mask fabrication 1044 includes a mask writer. A mask writer converts the RDF to an image on a substrate, such as a mask (reticle) 1045 or a semiconductor wafer 1053. The design layout diagram 1022 is manipulated by mask data preparation 1032 to comply with particular characteristics of the mask writer and/or requirements of IC fab 1050. In FIG. 10, mask data preparation 1032 and mask fabrication 1044 are illustrated as separate elements. In some embodiments, mask data preparation 1032 and mask fabrication 1044 can be collectively referred to as mask data preparation.

In some embodiments, mask data preparation 1032 includes optical proximity correction (OPC) which uses lithography enhancement techniques to compensate for image errors, such as those that can arise from diffraction, interference, other process effects and the like. OPC adjusts IC design layout diagram 1022. In some embodiments, mask data preparation 1032 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1032 includes a mask rule checker (MRC) that checks the IC design layout diagram 1022 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1022 to compensate for limitations during mask fabrication 1044, which may undo part of the modifications performed by OPC in order to meet mask creation rules.

In some embodiments, mask data preparation 1032 includes lithography process checking (LPC) that simulates processing that will be implemented by IC fab 1050 to fabricate IC device 1060. LPC simulates this processing based on IC design layout diagram 1022 to create a simulated manufactured device, such as IC device 1060. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1022.

It should be understood that the above description of mask data preparation 1032 has been simplified for the purposes of clarity. In some embodiments, data preparation 1032 includes additional features such as a logic operation (LOP) to modify the IC design layout diagram 1022 according to manufacturing rules. Additionally, the processes applied to IC design layout diagram 1022 during data preparation 1032 may be executed in a variety of different orders.

After mask data preparation 1032 and during mask fabrication 1044, a mask 1045 or a group of masks 1045 are fabricated based on the modified IC design layout diagram 1022. In some embodiments, mask fabrication 1044 includes performing one or more lithographic exposures based on IC design layout diagram 1022. In some embodiments, an electron-beam (e-beam) or a mechanism of multiple e-beams is used to form a pattern on a mask (photomask or reticle) 1045 based on the modified IC design layout diagram 1022. Mask 1045 can be formed in various technologies. In some embodiments, mask 1045 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 1045 includes a transparent substrate (e.g., fused quartz) and an opaque material (e.g., chromium) coated in the opaque regions of the binary mask. In another example, mask 1045 is formed using a phase shift technology. In a phase shift mask (PSM) version of mask 1045, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1044 is used in a variety of processes. For example, such a mask(s) is used in an ion implantation process to form various doped regions in semiconductor wafer 1053, in an etching process to form various etching regions in semiconductor wafer 1053, and/or in other suitable processes.

IC fab 1050 includes wafer fabrication 1052. IC fab 1050 is an IC fabrication business that includes one or more manufacturing facilities for the fabrication of a variety of different IC products. In some embodiments, IC Fab 1050 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1050 uses mask(s) 1045 fabricated by mask house 1030 to fabricate IC device 1060. Thus, IC fab 1050 at least indirectly uses IC design layout diagram 1022 to fabricate IC device 1060. In some embodiments, semiconductor wafer 1053 is fabricated by IC fab 1050 using mask(s) 1045 to form IC device 1060. In some embodiments, the IC fabrication includes performing one or more lithographic exposures based at least indirectly on IC design layout diagram 1022. Semiconductor wafer 1053 includes a silicon substrate or other proper substrate having material layers formed thereon. Semiconductor wafer 1053 further includes one or more of various doped regions, dielectric features, multi-level interconnects, and the like (formed at subsequent manufacturing steps).

Details regarding an integrated circuit (IC) manufacturing system (e.g., system 1000 of FIG. 10), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

One aspect of this description relates to an integrated circuit (IC) structure including a first layer and a second layer. The first layer includes a first metal structure coupled to a first power supply having a first voltage level and a second metal structure coupled to a second power supply having a second voltage level different from the first voltage level. The second layer is formed over the first layer. The second layer includes a first nano-sheet device coupled to the first metal structure and a second nano-sheet device adjacent to the first nano-sheet device. The second nano-sheet device is coupled to the second metal structure. A distance between the first nano-sheet device and the second nano-sheet device is less than a minimum n-well to n-well spacing. In some embodiments, the first layer includes a third metal structure coupled to a ground. In some embodiments, the second layer includes a third nano-sheet device coupled to the third metal structure. In some embodiments, the second layer includes a dummy nano-sheet device coupled to the second metal structure. In some embodiments, the IC structure includes a fourth layer over the second layer. In some embodiments, the fourth layer includes a fourth metal structure extending over each of the second nano-sheet device and the dummy nano-sheet device. In some embodiments, the second nano-sheet device is coupled to the second metal structure via the dummy nano-sheet device and the fourth metal structure. In some embodiments, the dummy nano-sheet device includes an active area coupling the second metal structure to the fourth metal structure. In some embodiments, the dummy nano-sheet device includes a thru via coupling the fourth metal structure to the third metal structure. In some embodiments, the IC structure includes a fifth layer in between the first layer and the second layer. In some embodiments, the fifth layer includes a first via coupling the first metal structure to the first nano-sheet device and a second via coupling the second metal structure to the second nano-sheet device. In some embodiments, the IC structure includes a sixth layer in between the first layer and the second layer. In some embodiments, the sixth is composed of oxide. In some embodiments, the first and second nano-sheet devices operate as part of a level shifter circuit. In some embodiments, the distance is less than 5 poly pitches.

Another aspect of this description relates to a method for operating an integrated circuit (IC) manufacturing system. The method includes placing a first metal pattern in a first layer. The first metal pattern corresponds to a first power rail having a first voltage level. The method includes placing a nano-sheet cell in a second layer over the first layer. A first portion of the nano-sheet cell corresponds to a first nano-sheet device and a second portion of the nano-sheet cell corresponds to a second nano-sheet device. The first portion of the nano-sheet cell is placed over the first metal pattern. The method includes placing a second metal pattern in a third layer over the first layer. The second metal pattern is placed over the second portion of the nano-sheet cell. The second metal pattern corresponds to a second power rail having a second voltage level different from the first voltage level. A distance between the first portion of the nano-sheet cell and the second portion of the nano-sheet cell is less than a minimum n-well to n-well spacing. In some embodiments, the method includes placing a third metal pattern in the first layer and adjacent to the first metal pattern. In some embodiments, the third metal pattern corresponds to a ground rail. In some embodiments, the third metal pattern is placed under a third portion of the nano-sheet cell corresponding to a third nano-sheet device. In some embodiments, the method includes placing a fourth metal pattern in the first layer and adjacent to the first metal pattern. In some embodiments, the fourth metal pattern corresponds to the second power rail. In some embodiments, the method includes placing a second nano-sheet cell in the second layer. In some embodiments, the second nano-sheet cell is placed in between the fourth metal pattern and the second metal pattern. In some embodiments, the second nano-sheet cell corresponds to a dummy nano-sheet device. In some embodiments, the second nano-sheet cell includes an active region in between the fourth metal pattern and the second metal pattern. In some embodiments, the dummy nano-sheet device includes a thru via region in between the fourth metal pattern and the second metal pattern. In some embodiments, the method includes placing a first via region in a fourth layer between the first layer and the second layer. In some embodiments, the first via region is between the first metal pattern and the first portion of the nano-sheet cell. In some embodiments, the method includes placing a second via region in a fifth layer between the second layer and the third layer. The second via region is between the second metal pattern and the second portion of the nano-sheet cell.

Another aspect of this description relates to an integrated circuit (IC) module including a first die including first nano-sheet devices coupled to a first power supply having a first voltage level. The first nano-sheet devices generate complementary signals. The IC module includes a second die including second nano-sheet devices coupled to a second power supply having a second voltage level different from the first voltage level. The second nano-sheet devices receive the complementary signals. In some embodiments, the second nano-sheet devices operate as part of a level shifter circuit. In some embodiments, the first nano-sheet devices operate as part of inverters. In some embodiments, the first and second nano-sheet devices receive their first and second power supply signals through back-end metals. In some embodiments, the first and second nano-sheet devices receive their first and second power supply signals through front-end metals.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit (IC) structure, comprising:
    a first layer comprising:
        a first nano-sheet device; and
        a second nano-sheet device disposed next to the first nano-sheet device along a first lateral direction; and
    a second layer disposed on a first side of the first layer, and comprising:
        a first metal structure coupled to a first power supply with a first voltage level;
        a second metal structure coupled to a second power supply with a second voltage level different from the first voltage level, the second metal structure spaced from the first metal structure along the first lateral direction; and
    a third layer disposed on a second side of the first layer opposite to the first side, and comprising:
        a first via coupled to the first nano-sheet device; and
        a second via coupled to the second nano-sheet device.

2. The IC structure of claim 1, further comprising:
    a fourth layer disposed on the first side between the first layer and the second layer, and comprising:
        a third via coupling the first metal structure to the first nano-sheet device; and
        a fourth via coupling the second metal structure to the second nano-sheet device.

3. The IC structure of claim 1, wherein the first nano-sheet device and the second nano-sheet device are spaced from each other with a first distance along the first lateral direction, and the first metal structure and the second metal structure are spaced from each other with a second distance along the first lateral direction, and wherein the first distance is different from the second distance.

4. The IC structure of claim 3, wherein the second distance is greater than the first distance.

5. The IC structure of claim 1, wherein the first and second nano-sheet devices are configured to operate as part of a level shifter circuit.

6. The IC structure of claim 1, further comprising a plurality of redistribution layer metals disposed opposite the second layer from the first layer.

7. The IC structure of claim 6, further comprising a plurality of bumps connected to the plurality of redistribution layer metals, respectively, wherein the plurality of bumps are disposed opposite the redistribution layer metals from the second layer.

8. The IC structure of claim 1, wherein the second layer is formed on a back side of a substrate, while the third layer is formed on a front side of the substrate.

9. The IC structure of claim 1, further comprising:
a fourth layer disposed opposite the first layer from the second layer, and comprising:
a plurality of third metal structures, at least of which is coupled to the first nano-sheet device or second nano-sheet device.

10. An integrated circuit (IC) structure, comprising:
a first layer comprising a first active region and a second active region, wherein the first and second active regions each extend along a first lateral direction, and the first and second active regions are spaced apart from each other along a second lateral direction perpendicular to the first lateral direction;
a second layer disposed on a first side of the first layer, and comprising:
a first metal structure coupled to a first power supply with a first voltage level;
a second metal structure coupled to a second power supply with a second voltage level; and
a third metal structure coupled to a third power supply with third second voltage level;
wherein the first to third voltage levels are different from each other;
wherein the first metal structure and the second metal structure are spaced from each other along the first lateral direction, with the third metal structure extending across the first and second metal structures along the first lateral direction.

11. The IC structure of claim 10, wherein the first active region continuously extends across the first and second metal structures along the first lateral direction, and the second active region continuously extends across the third metal structure along the first lateral direction.

12. The IC structure of claim 10, wherein the first metal structure and the second metal structure are each spaced from the third metal structure along the second lateral direction.

13. The IC structure of claim 10, wherein the first and second voltage levels correspond to VDD1 and VDD2, respectively, and the third voltage level corresponds to a ground voltage.

14. The IC structure of claim 10, wherein the first layer comprises:
a first nano-sheet device formed based on the first active region; and
a second nano-sheet device also formed based on the first active region;
wherein the first nano-sheet device and the second nano-sheet device are spaced from each other with a first distance along the first lateral direction.

15. The IC structure of claim 14, wherein the first metal structure and the second metal structure are spaced from each other with a second distance along the first lateral direction.

16. The IC structure of claim 15, wherein the first distance is less than the second distance.

17. The IC structure of claim 10, further comprising a third layer disposed on a second side of the first layer opposite to the first side, and comprising:
a plurality of first vias electrically coupled to the first active region.

18. The IC structure of claim 17, further comprising a fourth layer disposed between the first layer and the second layer, and comprising:
a second via electrically coupling the first metal structure to the first active region;
a third via electrically coupling the second metal structure to the first active region; and
a fourth via electrically coupling the third metal structure to the second active region.

19. An integrated circuit (IC) structure, comprising:
a first layer comprising a first active region and a second active region, wherein the first and second active regions each extend along a first lateral direction, and the first and second active regions are spaced apart from each other along a second lateral direction perpendicular to the first lateral direction;
a second layer disposed on a first side of the first layer, and comprising:
a first metal structure configured to provide VDD1;
a second metal structure configured to provide VDD2; and
a third metal structure configured to provide a ground voltage;
wherein the first metal structure and the second metal structure are spaced from each other along the first lateral direction, with the third metal structure extending across the first and second metal structures along the first lateral direction.

20. The IC structure of claim 19, wherein the first active region continuously extends across the first and second metal structures along the first lateral direction, and the second active region continuously extends across the third metal structure along the first lateral direction.

* * * * *